United States Patent
Wang et al.

(10) Patent No.: US 10,328,340 B2
(45) Date of Patent: Jun. 25, 2019

(54) METHOD, APPARATUS, AND RECORDING MEDIUM FOR CONTROLLING A GAME

(71) Applicant: NEOWIZ GAMES CORPORATION, Seongnam-si (KR)

(72) Inventors: Jung Hyun Wang, Yongin-Si (KR); Joong Hoon Nam, Seoul (KR); Sang Won Roh, Goyang-Si (KR)

(73) Assignee: Neowiz Games Corporation (KR)

( * ) Notice: Subject to any disclaimer, the term of this patent is extended or adjusted under 35 U.S.C. 154(b) by 366 days.

(21) Appl. No.: 15/213,871

(22) Filed: Jul. 19, 2016

(65) Prior Publication Data

US 2017/0021270 A1 Jan. 26, 2017

(30) Foreign Application Priority Data

Jul. 20, 2015 (KR) .................. 10-2015-0102332
Jan. 11, 2016 (KR) .................. 10-2016-0003211

(51) Int. Cl.
| | |
|---|---|
| A63F 13/00 | (2014.01) |
| A63F 13/2145 | (2014.01) |
| A63F 13/25 | (2014.01) |
| A63F 13/92 | (2014.01) |
| A63F 13/814 | (2014.01) |

(52) U.S. Cl.
CPC .......... *A63F 13/2145* (2014.09); *A63F 13/25* (2014.09); *A63F 13/814* (2014.09); *A63F 13/92* (2014.09)

(58) Field of Classification Search
None
See application file for complete search history.

(56) References Cited

U.S. PATENT DOCUMENTS

| | | | | |
|---|---|---|---|---|
| 2005/0255914 | A1* | 11/2005 | McHale ............... | A63F 13/10 463/31 |
| 2008/0113698 | A1* | 5/2008 | Egozy .................. | A63F 13/12 463/7 |
| 2008/0171595 | A1* | 7/2008 | Nakasaka ............ | A63F 13/10 463/31 |
| 2008/0280680 | A1* | 11/2008 | Dutilly ................ | A63F 13/00 463/36 |
| 2009/0258686 | A1* | 10/2009 | McCauley ........... | A63F 13/06 463/7 |

(Continued)

FOREIGN PATENT DOCUMENTS

| | | |
|---|---|---|
| JP | H09-168670 A | 6/1997 |
| JP | 2000-325664 A | 11/2000 |

(Continued)

OTHER PUBLICATIONS

URL, http://www.appbank.net/2014/06/24/iphone-application/835805.php.

(Continued)

*Primary Examiner* — Paul A D'Agostino
(74) *Attorney, Agent, or Firm* — Harness, Dickey & Pierce, PLC

(57) ABSTRACT

The present invention relates to a game control technology. Particularly, the present invention relates to a game control method using a user input, a game control apparatus, and a recording medium thereof, which variously control the displaying of components of a game screen so as to provide a game that allows various types of game play schemes.

16 Claims, 15 Drawing Sheets

(56) References Cited

U.S. PATENT DOCUMENTS

| | | | |
|---|---|---|---|
| 2011/0009191 A1* | 1/2011 | Naidenov | G10H 1/0016 463/35 |
| 2011/0281622 A1 | 11/2011 | Ryu | |
| 2012/0071241 A1* | 3/2012 | O | A63F 13/44 3/44 |
| 2012/0315977 A1* | 12/2012 | Asami | A63F 13/5375 463/24 |

FOREIGN PATENT DOCUMENTS

| | | |
|---|---|---|
| JP | 2001-187270 A | 7/2001 |
| JP | 2004-147846 A | 5/2004 |
| JP | 2004-298281 A | 10/2004 |
| JP | 2007-111436 A | 5/2007 |
| JP | 2011-240138 A | 12/2011 |
| JP | 2012-187136 A | 10/2012 |
| JP | 2012-525953 A | 10/2012 |
| JP | 2015-008966 A | 1/2015 |
| JP | 2015-042296 A | 3/2015 |
| JP | 2015-085174 A | 5/2015 |
| KR | 20110001518 A | 1/2011 |
| KR | 101073790 B1 | 10/2011 |
| KR | 2011-0125433 A | 11/2011 |
| KR | 2012-0134319 A | 12/2012 |

OTHER PUBLICATIONS

Sonic Development, "High 5 by Kakao New Rhythm Game", Apr. 29, 2016. Retrieved from the Internet URL: http://theappl.com/bbs/board.php?bo_table=game_news&wr_id=20196 (with English translation) (9 pages).

This is Game, "Tactical Battle in (Video) Drag! | Wonder Five Masters", Apr. 29, 2016. Retrieved from the Internet URL: http://www.thisisgame.com/webzine/news/nboard/4/?n=58861 (with English translation) (18 pages).

Office Action issued by Korea Intellectual Property Office (KIPO) dated Sep. 14, 2016 (without English translation) for counterpart Korean Application No. 10-2016-0003211 (6 pages).

"Android Game—Touch Mix FX (CosmicBird&TheBoy)—Ric", dated Nov. 11, 2012. Retrieved from the Internet URL: https://www.youtube.com/watch?v=xT0agSYK1mQ (16 pages).

Extended European Search Report issued by European Patent Office (EPO) regarding Application No. 17150613.2 dated May 15, 2017 (9 pages).

* cited by examiner

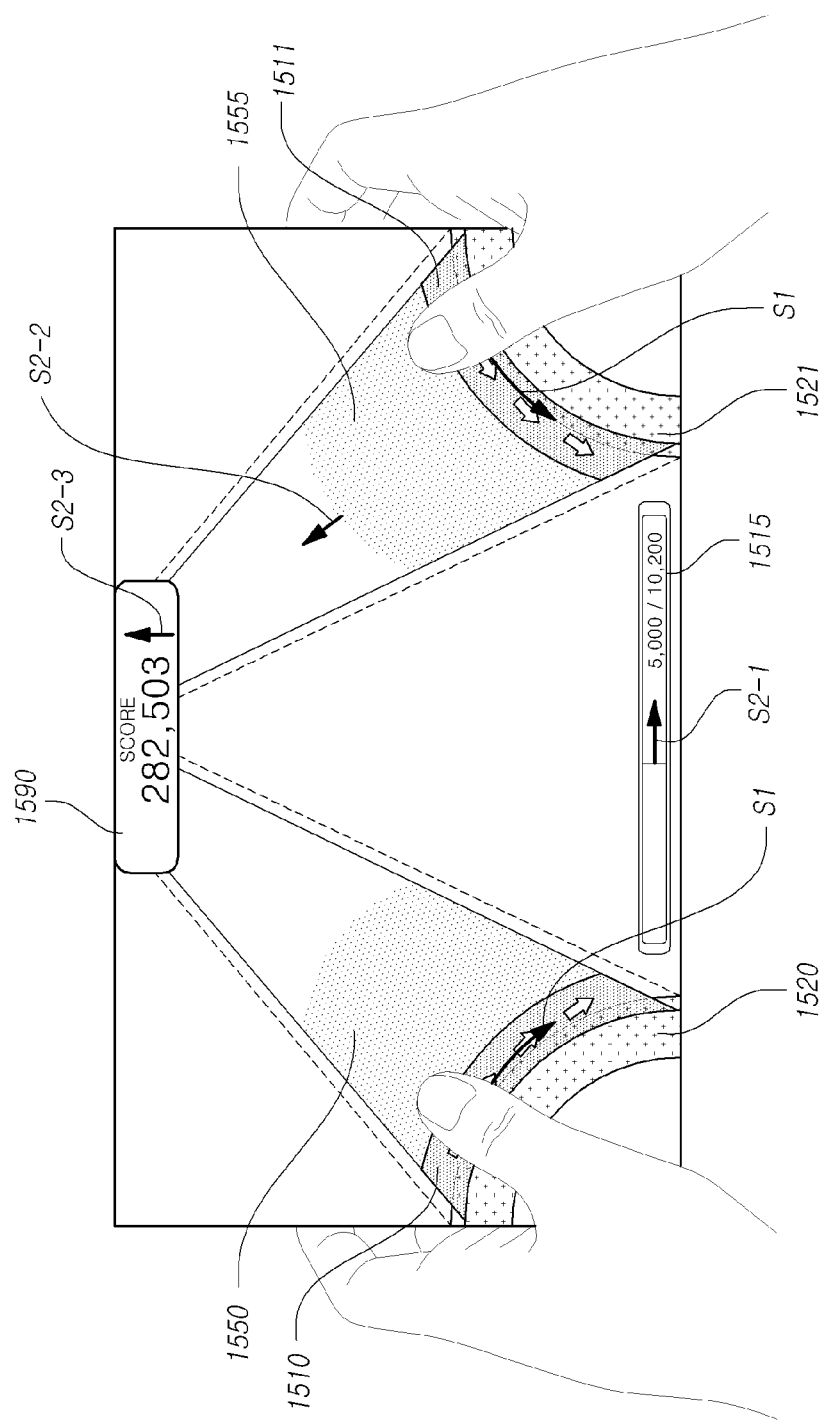

METHOD, APPARATUS, AND RECORDING MEDIUM FOR CONTROLLING A GAME

CROSS REFERENCE TO RELATED APPLICATION

This application claims priority from Korean Patent Application Nos. 10-2015-0102332 filed on Jul. 20, 2015 and 10-2016-0003211 filed on Jan. 11, 2016, which are hereby incorporated by reference for all purposes as if fully set forth herein.

BACKGROUND OF THE INVENTION

1. Field of the Invention

The present invention relates to a game control technology. Particularly, the present invention relates to a game control method using a user input, a game control apparatus, and a recording medium thereof, which variously control displaying components on a game screen so as to provide a game that allows various types of game play schemes.

2. Description of the Prior Art

Conventionally, there is a game that is played in a manner of: displaying an indicator to move for providing a guidance associated with an operation timing of a user; operating the indicator at a predetermined timing provided through the guidance by the indicator; determining the operation; and providing the result thereof. In association with the conventional game, the movement pattern of the indicator or the judgment scheme associated with the operation made by a user is significantly simple, and thus, the user may have lost interest in playing the game, which is a drawback.

Also, the difficulty level of a game is fixedly set at the point in time when the game starts and the game proceeds at the fixed difficulty level in a single game play. In this point of view, when the difficulty level is inappropriate for a user, the user may play the game at the fixed difficulty level until the corresponding game is terminated, and thus, the user's interest may decrease, which is a drawback.

Also, the scheme of obtaining a score corresponding to the result of the game does not include any variable, and thus, the scheme is simple. Accordingly, interest that may ignite competition between users may not be provided, which is a drawback.

SUMMARY OF THE INVENTION

In this background, an aspect of the present invention is to provide a game control method, a game control apparatus, and a recording medium thereof, which enable the difficulty level of a game set at a point in time when the game starts to be dynamically changed based on a play in the game, so that a user may simultaneously experience the current difficulty level and a higher difficulty level.

Also, another aspect of the present invention is to provide a game control method, a game control apparatus, and a recording medium thereof, which operate a note having various functions at an appropriate timing, and thus, may interest a user in playing a simple rhythm game.

Also, another aspect of the present invention is to provide a game control method, a game control apparatus, and a recording medium thereof, which provide characters having different retained skills and control a game based on the different retained skills.

To overcome the above drawbacks, according to the present invention, there is provided an apparatus for controlling a game, including: a display controller that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a receiving unit that receives a user input signal for each judgment area indicator; a judgment unit that judges whether note processing is successfully performed based on information associated with the proximity between the note and the judgment area indicator and the input signal; and a controller that controls the number of track areas or a user's obtained score to be changed when the note processing is successfully performed.

According to the present invention, there is provided a method of controlling a game, the method including: a display controlling step that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a receiving step that receives a user input signal for each judgment area indicator; a judgment step that judges whether note processing is successfully performed based on information associated with the proximity between the note and the judgment area indicator and the input signal; and a controlling step that controls the number of track areas or a user's obtained score to be changed when it is determined that the note processing is successfully performed.

According to the present invention, there is provided a computer-readable recording medium that records a program for implementing game control, wherein the program implements: a display controlling function that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a receiving function that receives a user input signal for each judgment area indicator; a judgment function that judges whether note processing is successfully performed based on information associated with the proximity between the note and the judgment area indicator and the input signal; and a controlling function that controls the number of track areas or a user's acquired score to be changed when it is determined that the note processing is successfully performed.

The present invention enables a user to play a game at a higher difficulty level or at a lower difficulty level during a predetermined period of time based on the expression of a note function in the game although the user plays the game at a predetermined difficulty level, and thus, may interest the user in playing the game.

Also, the present invention enables a user to indirectly play a game at a higher difficulty level or a lower difficulty level that, thus, may provide the user with information required for selecting the difficulty level of the game.

Also, the present invention provides a note including various functions, so as to increase the user's concentration on a game.

Also, the present invention provides characters having different retained skills, controls a game based on different retained skills, and maintains the user's interest.

BRIEF DESCRIPTION OF THE DRAWINGS

The above and other objects, features, and advantages of the present invention will be more apparent from the following detailed description taken in conjunction with the accompanying drawings, in which:

FIG. 15 is a diagram illustrating an operation of processing a super flick note according to an embodiment of the present invention.

DETAILED DESCRIPTION OF THE EXEMPLARY EMBODIMENTS

Figure 1:
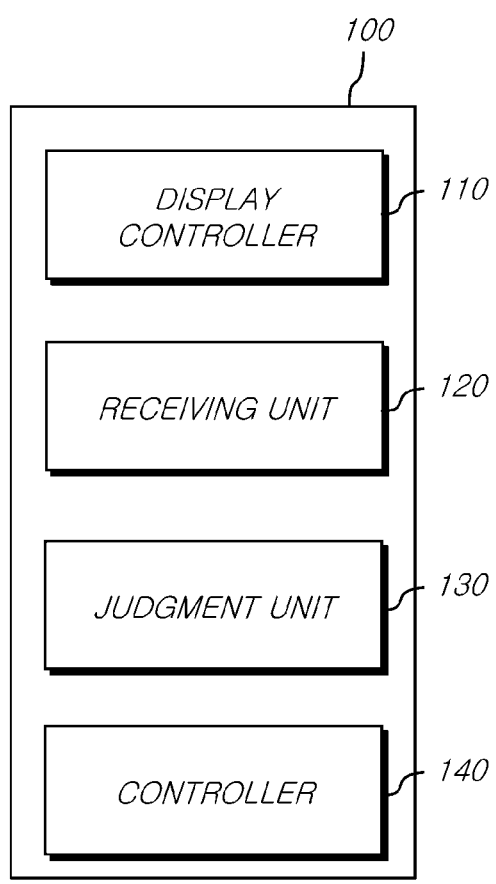
FIG. 1 is a block diagram illustrating a configuration of a game control apparatus according to an embodiment of the present invention.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram illustrating a configuration of a game control apparatus according to an embodiment of the present invention.

A game control apparatus 100, according to an embodiment of the present invention, may include: a display controller that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a receiving unit that receives a user input signal for each judgment area indicator; a judgment unit that judges whether note processing is successfully performed based on information associated with the proximity between the note and the judgment area indicator and the input signal; and a controller that controls the number of track areas or a user's obtained score to be changed when it is determined that the note processing is successfully performed.

Referring to FIG. 1, the game control apparatus 100 includes a display controller 110 that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas. The display controller 110 controls various components that configure the game screen to be displayed.

For example, the display controller 110 sets the plurality of areas on the game screen as track areas, and controls the track areas to be separately configured. Particularly, the number of track areas may be determined based on game settings or a difficulty level that a user selects when a game starts. The track areas may be configured as top-to-bottom areas or left-to-right areas, or may be configured as areas based on a predetermined angle. Also, the track areas may be configured in shapes that are symmetric against the center of the game screen.

As another example, the display controller 110 may control a judgment area indicator to be displayed on the game screen for each track area. Particularly, the judgment area indicator may be set to indicate a predetermined area for judging whether a note is successfully processed. The judgment area indicator may be displayed in one end of the game screen along the movement direction of the note, and may be displayed for each track area. That is, when the note moves from the top to the bottom of the game screen, the judgment area indicator may be displayed as a predetermined section in the bottom side of the track area. When the display controller 110 displays the judgment area indicator, the display controller 110 forms the judgment area indicator in various shapes and colors based on settings. For example, the display controller 110 may display the shape of the judgment area indicator in various shapes, such as a quadrangular shape, a circular shape, an oval shape, and the like, and there is no restriction on the color of the judgment. Therefore, the display controller 110 may configure a judgment area indicator for each track area to have the shape and color of the judgment area indicator according to previously stored game settings, and may display the same. The display controller 110 may dynamically set the location of a judgment area indicator displayed on the game screen, based on the difficulty level of a game or the progress of a game.

As another example, the display controller 110 may control the output of a note that is displayed moving in the direction where a judgment area indicator is located along a track area. Particularly, the display controller 110 may display a note that moves within each track area configured on the game screen. The note may be formed in various shapes and colors. The display controller 110 may perform a control to display a note to have a different shape and color based on the function or the obtained score of each note. Also, the display controller 110 may control the displaying of a note based on the movement speed of a note, which is determined based on at least one out of the difficulty level of a game, the function of each note, and a score that may be obtained when a corresponding note is successfully processed. In the present specification, a note is an object that is used for judging a score in a rhythm game or the like. When a note arrives at the scope of a judgment area indicator and a user input exists, it is determined that corresponding note processing is successfully performed. The note is a term including various meanings, and inclusively indicates the terms, such as an indicator, a marker, a target, or the like, and there is no restriction on the name thereof.

In addition, the display controller 110 may control the displaying of various effects required for a game. For example, the display controller 110 may control an obtained score to be displayed in a game, and may control the output of various effects based on whether the note processing is successfully performed or fails. Also, the display controller 110 may configure skills, background images, or the like that a user may use on a game screen, and may change an image output of the game screen, such as a game background or the like, based on music that is output to be different for each game. For example, a predetermined part of an image that is set as a background screen may be displayed by moving the part based on the progress of a game.

The game control apparatus 100 may include a receiving unit 120 that receives a user input signal for each judgment area indicator. The receiving unit 120 may receive an input signal of a user, which is input through an input unit of the game apparatus. The user input signal may be obtained based on the input of a predetermined key, or may be obtained based on the recognition of a touch input through a touch screen. In addition, the user input signal may be input through a separate touch input means, such as a touch pad or the like, thereby being obtained. The method of obtaining a user input signal is not limited. Hereinafter, for ease of descriptions, it is described that a user input signal is input through a touch screen.

The game control apparatus 100 includes a judgment unit 130 that judges whether note processing is successfully performed based on information associated with the proximity between a note and a judgment area indicator, and based on an input signal. The judgment unit 130 may judge whether the processing with respect to a corresponding note is successfully performed or fails based on an input signal of a user, the location of a note, and the location of a judgment area indicator. For example, the judgment unit 130 determines the degree of proximity between a note and a judgment area indicator at a point in time when a user input signal is input (or received), and determines whether note processing is successfully performed based on the corresponding degree of proximity. That is, the judgment unit 130 may determine the corresponding note processing is successfully performed when the user input signal is received at a point in time when the note is located within a predetermined scope based on the judgment area indicator. Alternatively, the judgment unit 130 may set a score, which a user may obtain in association with the note processing, to be different based on the information associated with the proximity between the note and the judgment area indicator. That is, when the user input signal is received at the point in time when the location of the note is exactly identical to the location of the judgment area indicator, the judgment unit 130 determines that note processing is successfully performed, and the maximum score of the corresponding note is obtained. Unlike the above, although the note is located within a successful processing scope set in advance based on the location of the judgment area indicator and the user input signal is received, when the location of the note and the location of the judgment area indicator have some difference, the judgment unit 130 may judge that the corresponding note processing is successfully performed and a score that is partially reduced from the maximum score of the corresponding note is obtained. The reduced score may be determined as a ratio or a fixed value based on an interval between the note and the judgment area indicator.

The judgment unit 130 may judge whether note processing is successfully performed by further taking into consideration the form of a user input signal at a point in time when an input signal is received. For example, it is determined that note processing is successfully performed only when a user input signal satisfies a corresponding condition based on a success judgment condition that is set for each note in the process of judging whether the note processing is successfully performed. For example, a predetermined note (e.g., a long note) includes, as a processing condition, a condition of maintaining a user input signal during at least a predetermined period of time, the judgment unit 130 may judge that the corresponding note processing is successfully performed in the case in which a user input signal is received when the starting point of the note arrives at the location of the judgment area indicator and the user input signal is maintained until the endpoint of the note arrives at the location of the judgment area indicator. To this end, a user needs to press the location of the judgment area indicator for the corresponding note processing from the starting point of the corresponding note to the endpoint. As another example, when a predetermined note (e.g., a vibrato note) includes, as a processing condition, a condition of changing the drag direction of a user input signal at least a predetermined period of time or at least a predetermined number of times, the judgment unit 130 judges that corresponding note processing is successfully performed only when an input signal is maintained from a point in time when the starting point of a note (the note is displayed, including the starting point and the end point which are connected in a predetermined length) arrives at a judgment area indicator to a point in time when the endpoint of the note arrives at the judgment area indicator, and the input signal is a drag signal of which the drag direction is changed at least a predetermined number of times or at least a predetermined period of times within a single track area. In addition, the successful processing condition may be set to be different based on a function set for each note, and the successful processing condition may be associated with the shape of a corresponding note. In the above, the descriptions have been provided from the perspective of the long note and the vibrato note. However, various notes may be set, such as a basic note that includes only a touch input as a processing condition, a slide note that includes a drag input associated with the shape of a note, provided throughout a plurality of track areas, as a processing condition, and the like.

The game control apparatus 100 may include a controller 140 that performs a control to change the number of track areas or a user's obtained score when it is determined that the note processing is successfully performed. When the judgment unit 130 judges that the corresponding note processing is successfully performed, the controller 140 changes the number of track areas where a game is currently played. Alternatively, when it is determined that the corresponding note processing is successfully performed, the controller 140 may perform a control to change a user's accumulated obtained score based on whether each note processing is successfully performed or by calculating a detail obtained score associated with the successful note processing. For example, when it is determined that the user successfully processes a note having a predetermined function, the controller 140 may perform a control to decrease or increase the number of track areas based on the successful processing of the corresponding note.

A conventional track area is a part that is associated with the difficulty level of a game, and is a fixed value until a corresponding game is terminated once a user selects predetermined music or a predetermined difficulty level. However, according to the present invention, the controller 140 may perform a control to dynamically change the number of track areas based on whether a note having a function of changing the number of track areas is successfully processed. Accordingly, a user may be immersed in the game due to the number of track areas, which is dynamically changed, in addition to note processing occurring in a fixed track area.

Hereinafter, changing the number of track areas based on the above described note processing will be described with reference to a drawing. A processing method associated with the occurrence of a vibrato note will be described in detail.

Figure 2:
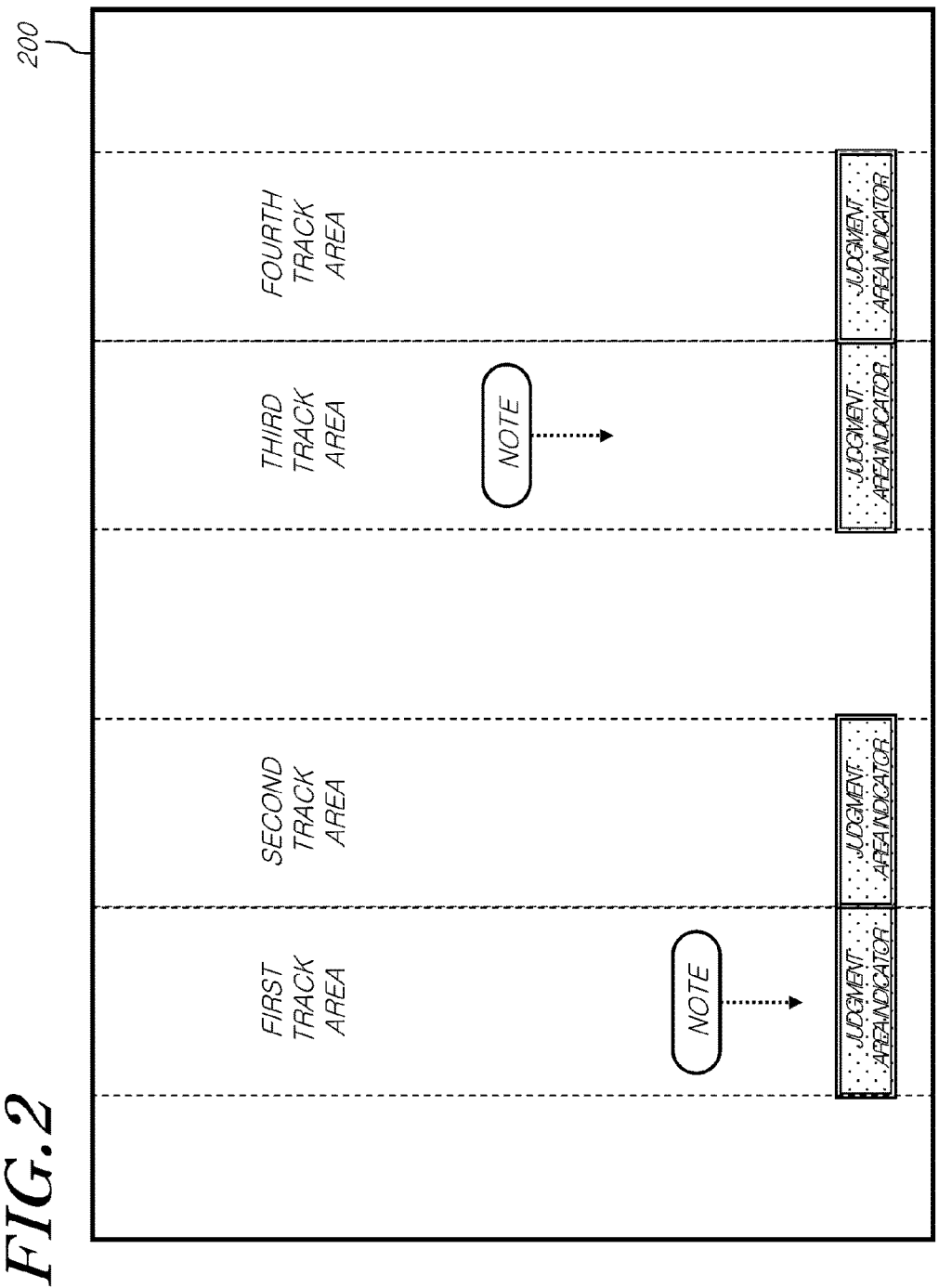
FIG. 2 is a diagram illustrating a game display screen according to an embodiment of the present invention.

FIG. 2 is a diagram illustrating a game display screen according to an embodiment of the present invention.

Referring to FIG. 2, a game screen 200 is configured in the top-to-bottom direction. For ease of description, this is merely used for illustrative purposes, the game screen 200 may be configured in the left-to-right direction. As described above, the game screen 200 is formed of a plurality of track areas, and a note that moves along each track area may be displayed. To determine whether note processing is successfully performed, a judgment area indicator may be formed for each track area. On the game screen 200, a total of 4 track areas are formed, and each note is displayed moving in the direction of the judgment area indicator in a first track area and a third track area. The origination location, the movement speed, and the like of a note may be controlled to be associated with music of a corresponding game, so that a user may feel the rhythm of the music. That is, when a user plays a game by selecting music with fast beats, the origination location and the movement speed of a note may be set to be fast, based on the beats. Also, the origination location of a note may be determined to be appropriate for the rhythm of music. Information associated with game settings, such as the origination location of a note associated with music, the type of a note, and the movement speed of a note, and the like may be stored in a game server or a storage space of a game apparatus where a corresponding game is executed.

Figure 3:
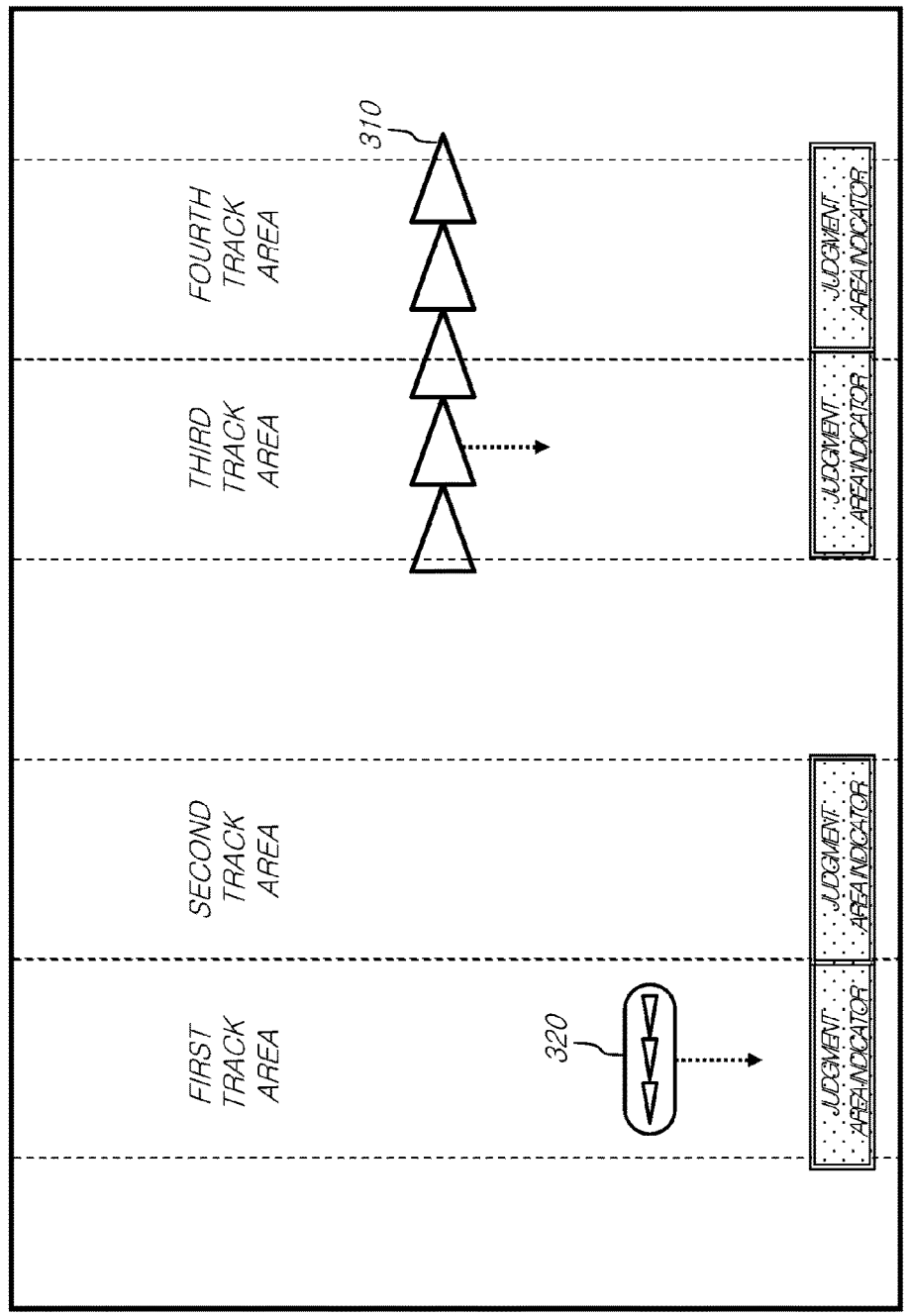
FIG. 3 is a diagram illustrating a note having a function of changing the number of track areas according to an embodiment of the present invention.

FIG. 3 is a diagram illustrating a note having a function of changing the number of track areas according to an embodiment of the present invention.

The display controller 110 of the present invention may perform a control to output a predetermined note by including a direction indicating shape indicating a direction therein. Also, the display controller 110 may perform a control so that a predetermined note is output moving in the direction of a judgment area indicator in two or more track areas.

Referring to FIG. 3, a note 310 and 320 having a function of changing the number of track areas may include a direction indicating shape indicating a predetermined direction. For example, the display controller 110 may perform a control to display the predetermined note 310 in two or more track areas. The predetermined note 310 displayed in two or more track areas may include a direction indicating shape indicating a direction. The note 310 may be displayed throughout a third track area and a fourth track area, and may move in the direction of a judgment area indicator. Also, the note 310 may include a direction indicating shape indicating the outside of a game screen.

As another example, the display controller 110 may perform a control to display the predetermined note 320 within a single track area, and the note 320 displayed within a first track area moves in the direction of a judgment area indicator. Also, the note 320 may include a direction indicating shape indicating the outside of the game screen.

When the note 310 or 320 arrives at the location of the judgment area indicator, a user may process the corresponding predetermined note 310 or 320 by inputting a drag signal in the direction indicated by the corresponding direction indicating shape.

When the processing of the note 310 or 320 is successfully performed, the number of track areas may be decreased or increased. The increase or decrease in the number of track areas may be determined based on the direction indicating shape of a corresponding note and the number of track areas where the game is currently played. For example, in the case in which the number of track areas where the game is currently played is 4 and a direction indicating shape indicates the outside of the game screen, when note processing is successfully performed, the number of track areas may be changed to 2. Alternatively, in the case in which the number of track areas where the game is currently played is 2 and a direction indicating shape indicates the outside of the game screen, when note processing is successfully performed, the number of track areas may be changed to 6. The number of track areas to which the number of track areas is changed when the note processing is successfully performed based on the direction indicating shape and the number of track areas, and may be variously determined according to settings stored in advance.

The shape of the note 310 or 320 having the function of changing the number of track areas is merely an example, and the shape of the note having the function of changing the number of track areas may be variously configured by game settings, user settings, or the like. For example, the note having the function of changing the number of track areas may not include a shape indicating a direction. In this instance, the user may perform processing by touching a corresponding note, touching the corresponding note at least a predetermined period of time, or inputting a drag signal, so as to express the function of changing the number of track areas. That is, the shape of the note in FIG. 3 is merely for illustrative purpose, and the shape of the corresponding note is not limited to note 310 or 320.

When the processing of the note having the function of changing the number of track areas fails, the number of track areas is not changed, and the processing of the note having the function of changing the number of track areas may not affect an obtained score. That is, although a user successfully processes the corresponding note, only the number of track areas is changed and a score is not obtained. Therefore, the user may selectively adjust the difficulty level of a game by changing the number of track areas irrespective of an obtained score, and may perform the game. Alternatively, the processing of the note having the function of changing the number of track areas may affect an obtained score. For example, when a user successfully processes a corresponding note, a predetermined score may be obtained, and the obtained score may be variously applied based on game settings, the difficulty level of a game, and a user's processing type.

Figure 4:
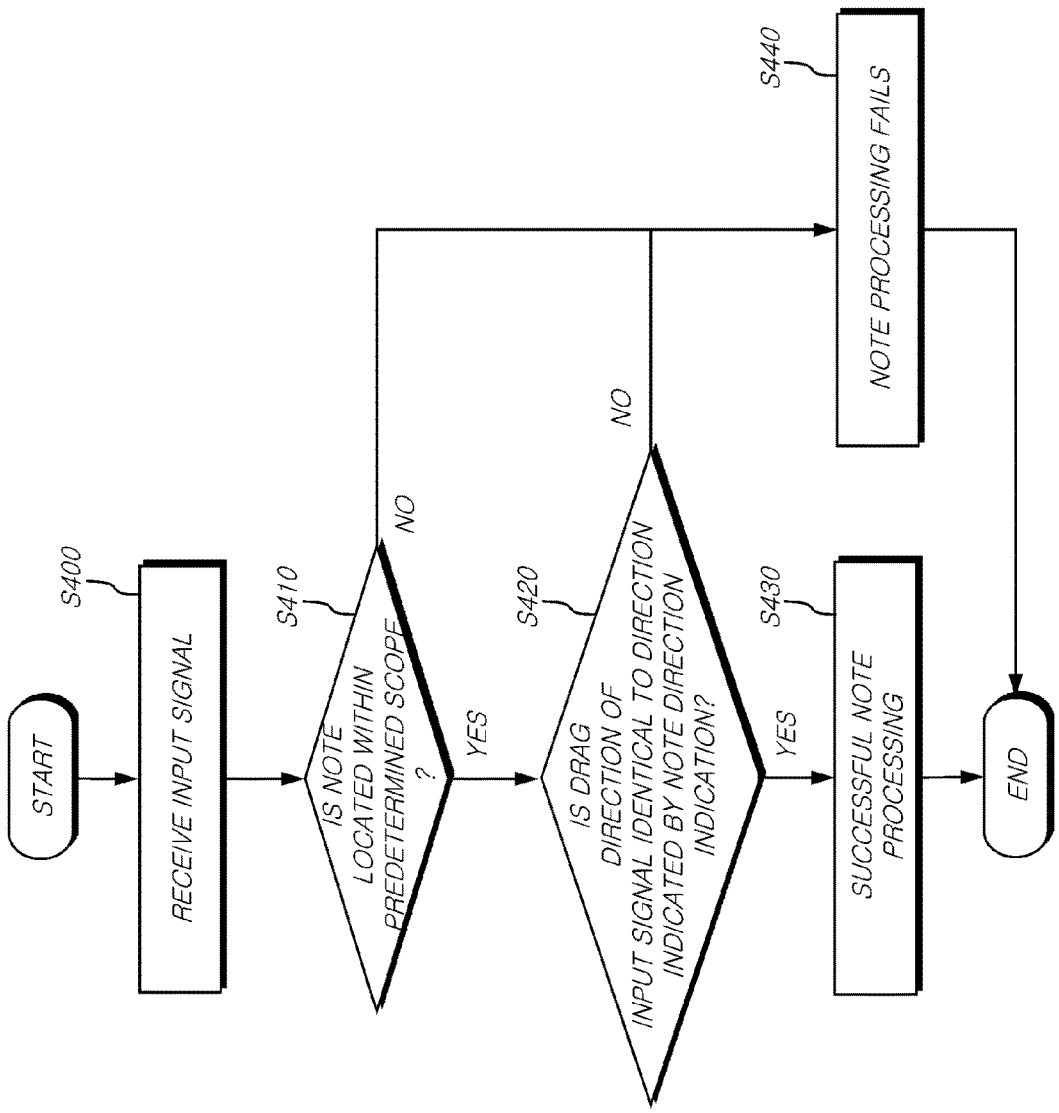
FIG. 4 is a diagram illustrating operations of a judgment unit according to an embodiment of the present invention.

FIG. 4 is a diagram illustrating operations of a judgment unit according to an embodiment of the present invention.

The judgment unit 130 according to an embodiment of the present invention determines that note processing is successfully performed when an input signal is received at a point in time when a note is located within a predetermined scope based on a judgment area indicator, and the direction indicated by the note and the drag direction of the input signal are identical.

Referring to FIG. 4, the judgment unit 130 obtains an input signal that occurs based on a touch input of a user in operation S400. As described above, the receiving unit 120 obtains the input signal from an input means, and transfers the same to the judgment unit 130.

The judgment unit 130 determines whether the note is close to the location of a judgment area indicator in operation S410. For example, to determine whether note processing is successfully performed, a predetermined scope may be set based on the location of a judgment area indicator. That is, the scope for judging whether note processing is successfully performed may be set in advance, so that a graded score is provided although the location of the note is not exactly identical to the location of the judgment area indicator. Through the above, the judgment unit 130 judges whether the corresponding note is located within the scope that is set based on the location of the judgment area indicator. Also, when the judgment unit 130 compares a point in time when an input signal is received and the location of a note, and determines that the input signal is received although the note is located outside the scope set in advance, the judgment unit 130 determines note processing with respect to the corresponding note fails in operation S440. That is, when a user inputs a touch too early or too late, and the interval between the location of the note and the location of the judgment area indicator becomes greater than or equal to the scope set in advance, the judgment unit 130 determines that processing with respect to the corresponding note fails. Alternatively, the judgment unit 130 distinguishes whether the note does not yet arrive at the location of the judgment area indicator, or the note passes the location of the judgment area indicator, and determines whether note processing is successfully performed.

When the note and the judgment area indicator are close within the scope set in advance, at the point in time when the user receives the input signal in operation S410 (YES in operation S410), the judgment unit 130 determines whether the drag direction of the input signal and the direction indicated by the direction indicating shape of the note are identical in operation S420. For example, as described in FIG. 3, a note having a function of changing the number of track areas may include a direction indicating shape, and may include the same as a note processing condition. Therefore, the judgment unit 130 distinguishes whether the user input signal is a drag signal or a touch signal with respect to the note having the function of changing the number of track areas, determines whether the corresponding drag direction is identical to the direction indicated by the direction indicating shape of the corresponding note when the user input signal is the drag signal, and determines whether note processing is successfully performed. For example, when the note direction indicating shape and the drag direction are not identical, the judgment unit 130 determines that processing with respect to the corresponding note fails in operation S440. As another example, when the direction indicated by the note direction indicating shape and the drag direction are identical, the judgment unit 130 determines that processing with respect to the corresponding note is successfully performed in operation S430. As described above, when the note processing is successfully performed, the controller 140 may increase or decrease the number of track areas by taking into consideration the direction indicating shape of the corresponding note and the number of current track areas.

In FIG. 4, descriptions have been provided based on the case of determining whether the note including the function of changing the number of track areas is successfully performed. In the case of a note having another function, whether a processing condition that is set for each of the notes having other functions is satisfied is determined based on an input signal in operation S420. For example, in the case of a long note, whether note processing is successfully performed is determined by determining whether an input signal is maintained for at least a predetermined period of time.

Hereinafter, changing the number of track areas in association with processing of a note having a function of changing the number of track areas will be described with reference to FIGS. 5 and 6.

Figure 5:
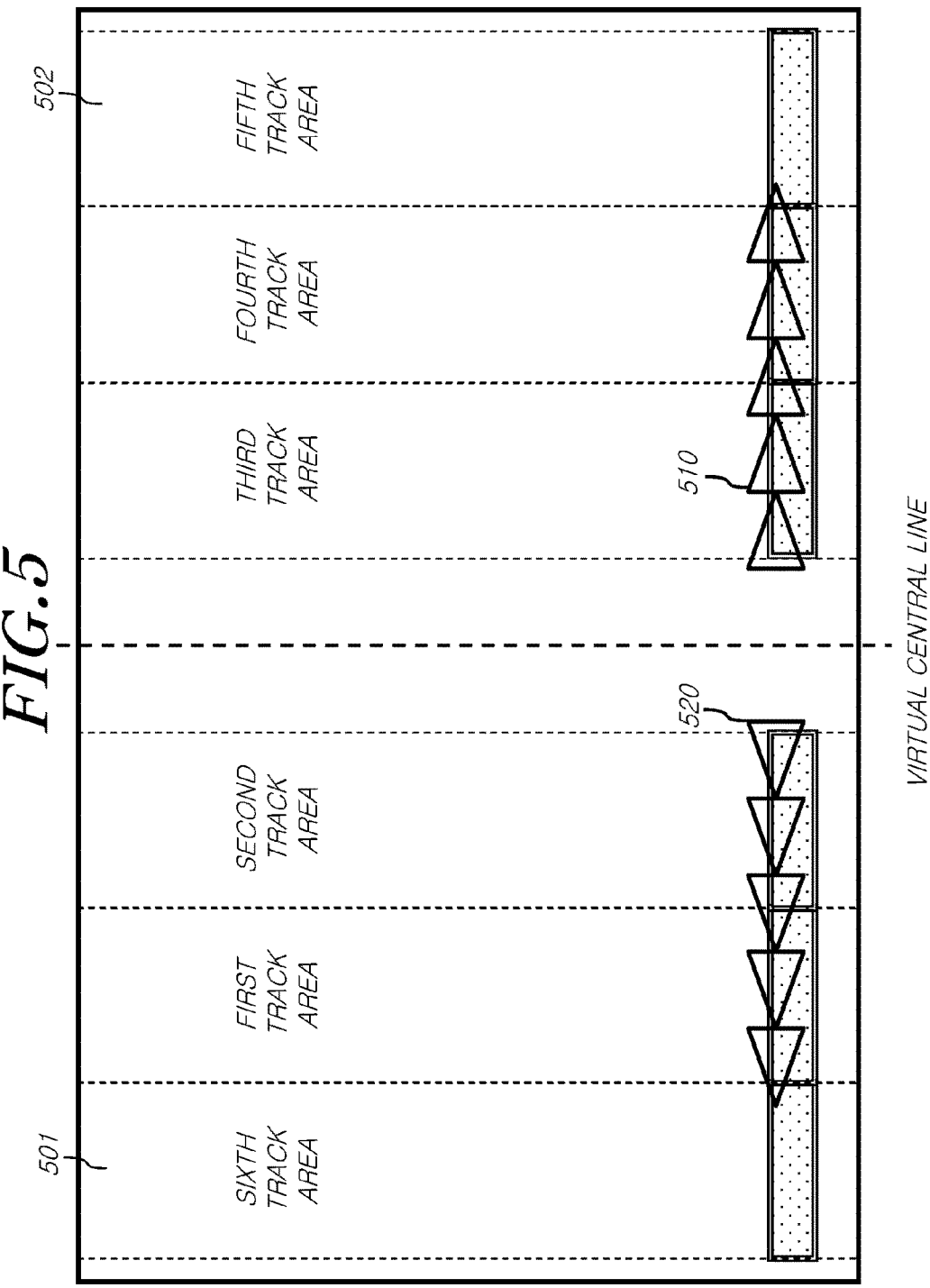
FIG. 5 is a diagram illustrating an example of increasing the number of track areas based on a note according to an embodiment of the present invention.

FIG. 5 is a diagram illustrating an example of increasing the number of track areas based on a note according to an embodiment of the present invention.

The display controller 110 of the present invention performs a control to divide a game screen into a first area and a second area based on a virtual central line, and to display at least one track area in each area. Also, the note may be displayed in at least one out of the first area and the second area.

Referring to FIG. 5, the display controller 110 of the present invention performs a control to divide a game screen into a first area and a second area based on a virtual central line that distinguishes the game screen as a left part and a right part, and to display two track areas in each area. That is, first and second track areas and third and fourth track areas may be displayed in different areas. As a game progresses, a note 510 and 520 having a function of changing the number of track areas may be displayed, and the corresponding note 510 or 520 may be formed throughout all of the track areas displayed in each area. For example, the note 510 may be displayed moving throughout both the third track area and the fourth track area, and the note 520 may be displayed moving throughout the first track area and the second track area. As described above, a note may be displayed in only one area, or may be formed in a symmetrical shape, as illustrated in FIG. 5.

When the note 510 or 520 arrives at the location of a judgment area indicator, a user may process the corresponding note by generating an input signal. The judgment unit 130 determines whether the corresponding note having the function of changing the number of track areas is successfully performed through the process of FIG. 4.

When it is determined that note processing is successfully performed in any one of the first area and the second area, the controller 140 may perform a control to change the number of track areas included in the area where the note processing is successfully performed, and to output the same. For example, when it is determined that processing of the note 520 is successfully performed in the area where the first track area and the second track area are located, the controller 140 may increase the number of track areas based on the direction indicating shape of the corresponding note and the number of track areas that are displayed in the corresponding area. That is, the controller 140 may perform a control to generate a sixth track area 501. In the same manner, when it is determined that processing of the note 510 is successfully performed in the area where the third track area and the fourth track area are located, the controller 140 may increase the number of track areas based on the direction indicating shape of the corresponding note and the number of track areas that are displayed in the corresponding area. That is, the controller 140 may perform a control to generate a fifth track area 502.

In FIG. 5, descriptions have been provided based on the case of increasing the number of track areas when corresponding notes are displayed to be symmetrical. However, when a corresponding note is displayed in only one area (e.g., the area where the first track area and the second track area are located or the area where the third track area and the fourth track area are located), or only a note in any one of the areas is successfully processed, the controller 140 may change the number of track areas in the corresponding area. That is, when the processing of the note 510 is successfully performed and the processing of the note 520 fails, the controller 140 may perform a control to generate the fifth track area 502 and may perform a control to not generate the sixth track area 501. Therefore, in this instance, after processing the note 510 or 520, the user proceeds with the game by processing a note that moves through the first track area to the fifth track area.

The controller 140 may perform a control to change the number of track areas included in an area that is different from an area where a note is processed, based on game settings. For example, when the processing of the note 510 is successfully performed, the sixth track area 501 may be generated and the fifth track area 502 may not be generated.

Figure 6:
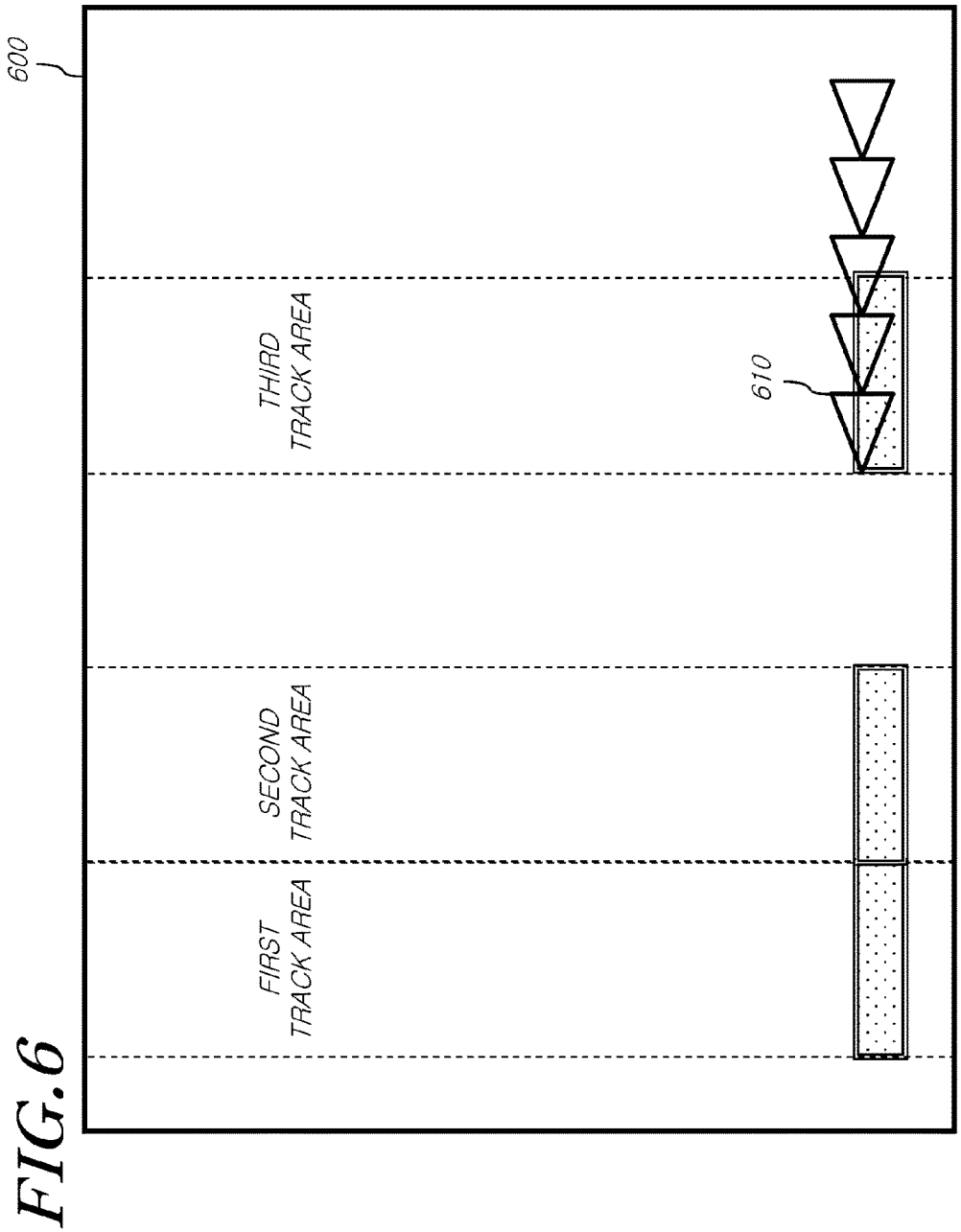
FIG. 6 is a diagram illustrating an example of decreasing the number of track areas based on a note according to an embodiment of the present invention.

FIG. 6 is a diagram illustrating an example of decreasing the number of track areas based on a note according to an embodiment of the present invention.

Referring to FIG. 6, a note 610 having a function of changing the number of track areas may be generated in only one of a first area and a second area. That is, the note 610 may be displayed in only the right area of a game screen 600. As described above, the corresponding note 610 may include a direction indicating shape, and when a drag input signal is input in the identical direction through judgment area indicators of all tracks where corresponding note 610 is formed at a point in time when the note 610 arrives at a judgment area indicator, it is determined that the corresponding note is successfully performed.

In this instance, the controller 140 may perform a control to decrease the number of track areas based on the direction indicating shape of the corresponding note 610 and the number of track areas included in an area where the corresponding note 610 is formed. That is, when the third track area and the fourth track area exist, as illustrated in FIG. 5, the single note 610 may be generated in both the third track area and the fourth track area. In this instance, a user drags a drag touch from the judgment area indicator of the fourth track area to the area of the judgment area indicator of the third track area to process the corresponding note 610, and when the direction of the drag input signal is identical to the direction indicated by the direction indicating shape of the corresponding note 610, it is determined that note processing is successfully performed. Therefore, the controller 140 may perform a control to delete the fourth track area based on settings stored in advance, so that only the first track area to the third track area are formed on the game screen 600.

Subsequently, notes that are generated may move through only the first track area to the third track area.

The controller 140 may distinctively set an obtained score associated with successful note processing, based on the number of track areas. For example, the controller 140 may set an obtained score associated with the processing of a note that moves through each track area to be different in grades based on the changing of the number of track areas. For example, when the number of track areas increases, the controller 140 may set an obtained score associated with note processing to be increased. As another example, when the number of track areas increases, the controller 140 may set an obtained score associated with note processing to be decreased. As another example, when the number of track areas decreases, the controller 140 may set an obtained score associated with note processing to be decreased. As another example, when the number of track areas decreases, the controller 140 may set an obtained score associated with note processing to be increased. Through the above, a user may increase an obtained game score through various strategies in a game environment, and may be interested in the strategies in association with a rhythm game. That is, a user may directly determine whether to process a note having a function of changing the number of track areas based on a current situation.

As described above, there are various types of notes having various functions. Hereinafter, a vibrato note that requires a user's predetermined input signal will be described. The vibrato note is a name that is merely used for the illustrative purpose, and the name of a note is not limited thereto.

Figure 7:
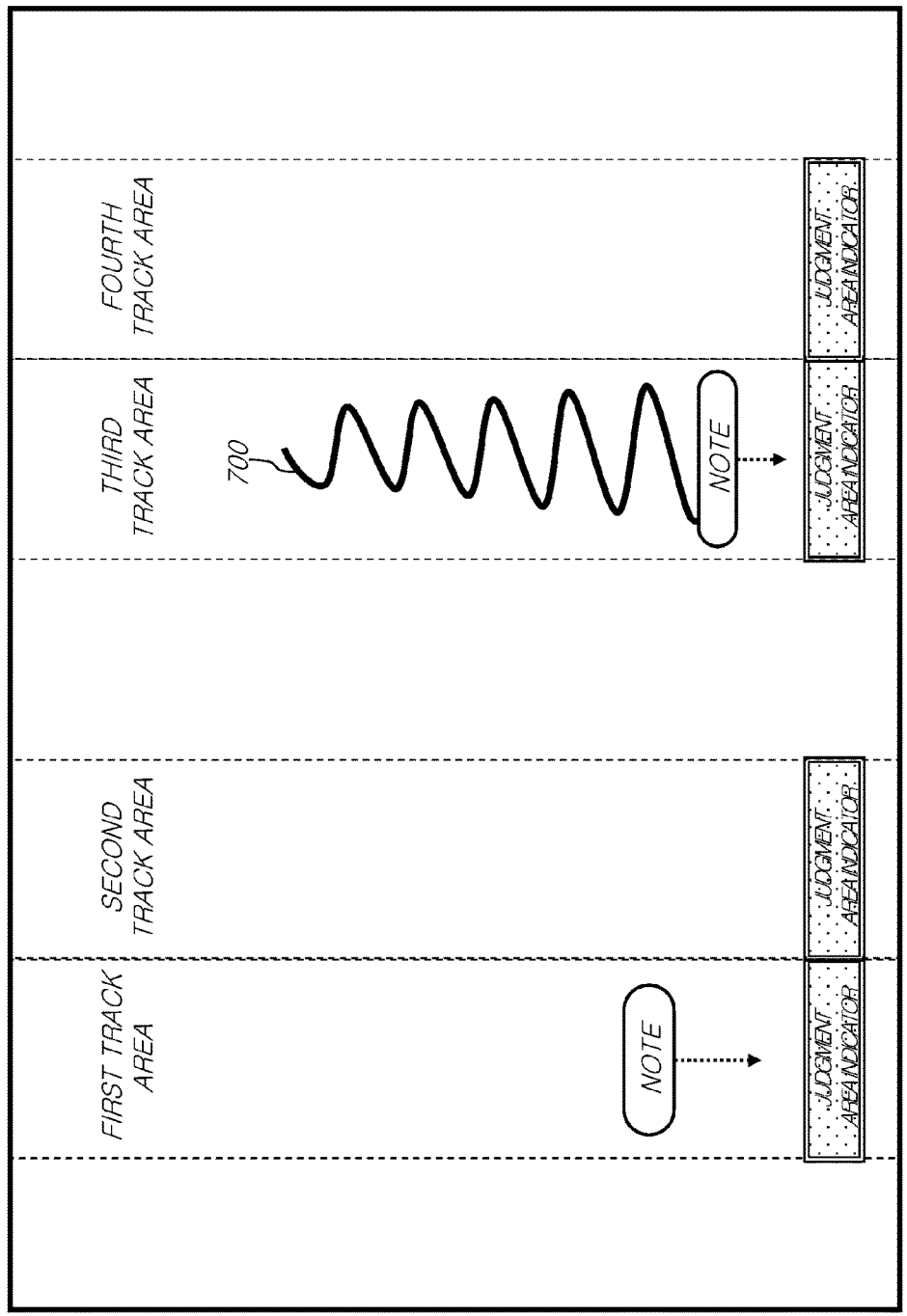
FIG. 7 is a diagram illustrating a vibrato note according to an embodiment of the present invention.

FIG. 7 is a diagram illustrating a vibrato note according to an embodiment of the present invention.

Referring to FIG. 7, a vibrato note 700 may include a starting point and an endpoint that are connected in a predetermined length. For example, the vibrato note 700 may be displayed in a shape including one or more inflection points between the starting point and the endpoint. Alternatively, the vibrato note 700 may be displayed in a shape in which the horizontal length of a note become shorter as it gets close to the starting point and the endpoint.

The judgment unit 130 may take into consideration whether the vibrato note 700 and a judgment area indicator are proximate, whether an input signal is maintained, and a drag type of an input signal, to judge the vibrato note 700. For example, when an input signal is maintained from a point in time when the starting point of the vibrato note 700 arrives at a judgment area indicator to a point in time when the endpoint of the note arrives at the judgment area indicator, the judgment unit 130 judges that processing of the note 700 is successfully performed. In this instance, when the input signal is a drag signal of which the drag direction is changed at least a predetermined number of times or a predetermined period of time within a single track area, the corresponding note 700 may be successfully processed. Hereinafter, an operation of judging whether the vibrato note 700 is successfully performed will be described in detail with reference to FIG. 8.

Figure 8:
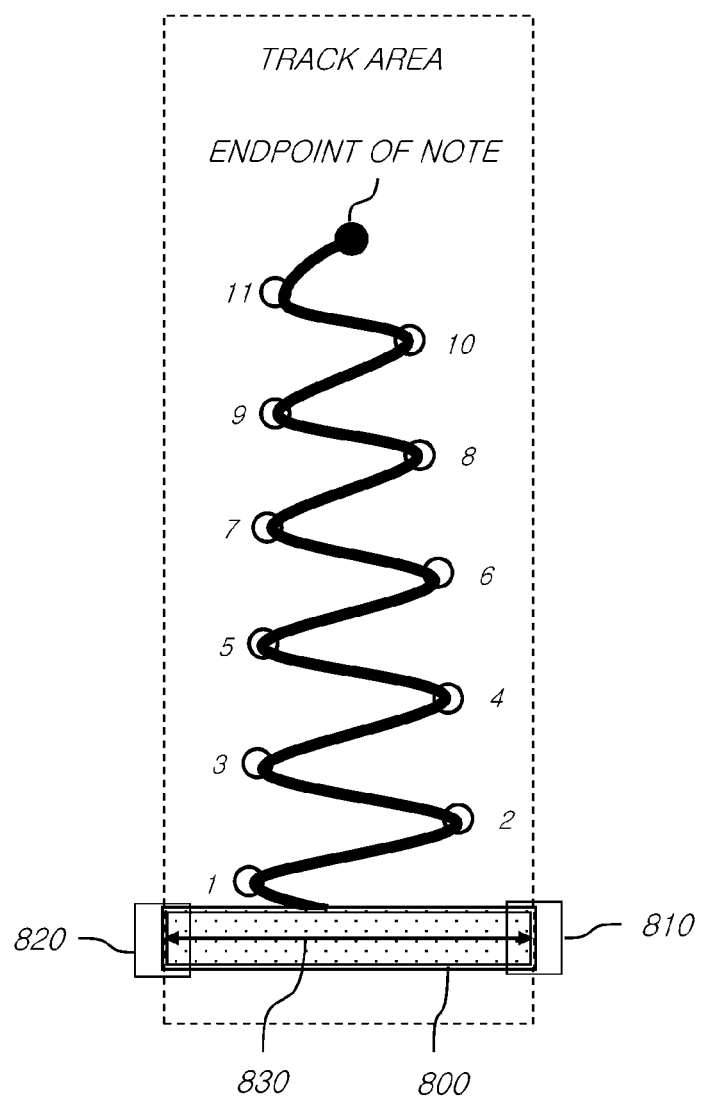
FIG. 8 is a diagram illustrating an operation of note processing on a vibrato note according to an embodiment of the present invention.

FIG. 8 is a diagram illustrating operations of note processing on a vibrato note according to an embodiment of the present invention.

Referring to FIG. 8, a vibrato note may be displayed in a single track area. The vibrato note may be formed as a predetermined length of a line including a predetermined number of inflection points, and may include a starting point and an endpoint. A user input signal may be a touch signal, and may be received when the area of a judgment area indicator 800 is touched.

The judgment unit 130 may judge whether a vibrato note is successfully processed by comparing a point in time when a user input signal is received and the location of the starting point of the vibrato note that approaches the judgment area indicator 800. For example, as described above, when a user input signal is not received within a period in which the starting point of the vibrato note is located within the scope set in advance based on the judgment area indicator 800, the judgment unit 130 judges that the processing of the corresponding vibrato note fails. When the user input signal is received within the corresponding period, the judgment unit 130 makes a judgment based on the following judgment standard.

When a user input signal is received at a point in time when the starting point of the vibrato note arrives at the scope of the judgment area indicator 800, the judgment unit 130 may determine whether the user input signal is maintained, and whether the drag direction is continuously changed at least a predetermined number of times or at least a predetermined period of time within the judgment area indicator 800. For example, the judgment unit 130 determines whether the user input signal is continuously maintained from the starting point of the vibrato note to the endpoint. Also, the judgment unit 130 determines whether a user input signal is maintained as a drag signal by changing the direction right and left within the judgment area indicator 800 that is formed in a single track area. That is, a user needs to initially touch the area of the judgment area indicator 800, and needs to input a drag signal in the right and left directions 830 until the endpoint of the vibrato note arrives at the location of the judgment area indicator 800 within the area of the judgment area indicator 800.

For example, when the drag signal is maintained from a point in time when the starting point of the vibrato note arrives at the judgment area indicator 800 to a point in time when the endpoint of the vibrato note arrives at the judgment area indicator 800, the judgment unit 130 judges that note processing is successfully performed.

As another example, when an input signal that provides dragging right and left is maintained during a predetermined period of time after a point in time when the starting point of the vibrato note arrives at the judgment area indicator 800, the judgment unit 130 judges that note processing is successfully performed.

As another example, when a user input signal is received from a point in time when the starting point of the vibrato note arrives at the judgment area indicator 800 and an inflection point of the user's drag direction is generated as many times as the number of the inflection points of the vibrato note, the judgment unit 130 judges that note processing is successfully performed. For example, the vibrato note of FIG. 8 includes 11 inflection points including the endpoint. Therefore, a user needs to input a drag signal in the right and left directions 830 within the area of the judgment area indicator 800, and at the same time, needs to change the direction 11 times.

As another example, when a user input signal is received from a point in time when the starting point of the vibrato note arrives at the judgment area indicator 800, and a drag signal including at least a predetermined number of inflection points is input, the judgment unit 130 judges that note processing is successfully performed. That is, irrespective of the number of inflection points of the vibrato note, when the drag direction is changed at least a predetermined number of times to process the corresponding note, the judgment unit 130 judges that the corresponding note processing condition is satisfied.

To accurately determine a right-and-left drag signal of the user, an inflection judgment area 810 or 820 may be formed at the end of the track area of the judgment area indicator 800. That is, when a user's touch input arrives at the area 820 through dragging, and the drag direction is inflected within the area 820, the judgment unit 130 determines that a single inflection point is generated. Referring to FIG. 8, a user performs dragging up to the area 820 and provides dragging by changing the drag direction to the direction of the area 810 to correspond to an inflection point 1 of the vibrato note. Subsequently, the user performs dragging in the direction of the area 820 by changing the drag direction in the area 810 to correspond to an inflection point 2 of the vibrato note. As described above, the user's drag signal performs dragging in the area of the judgment area indicator 800, and repeats dragging based on the number of inflection points of the vibrato note or during a predetermined period of time. The area 810 and the area 820 may be set in advance to readily sense the change of the drag direction of the user, through an experiment or the like.

A game control method that performs all of the above described operations of the game control apparatus of the present invention will be described.

Figure 9:
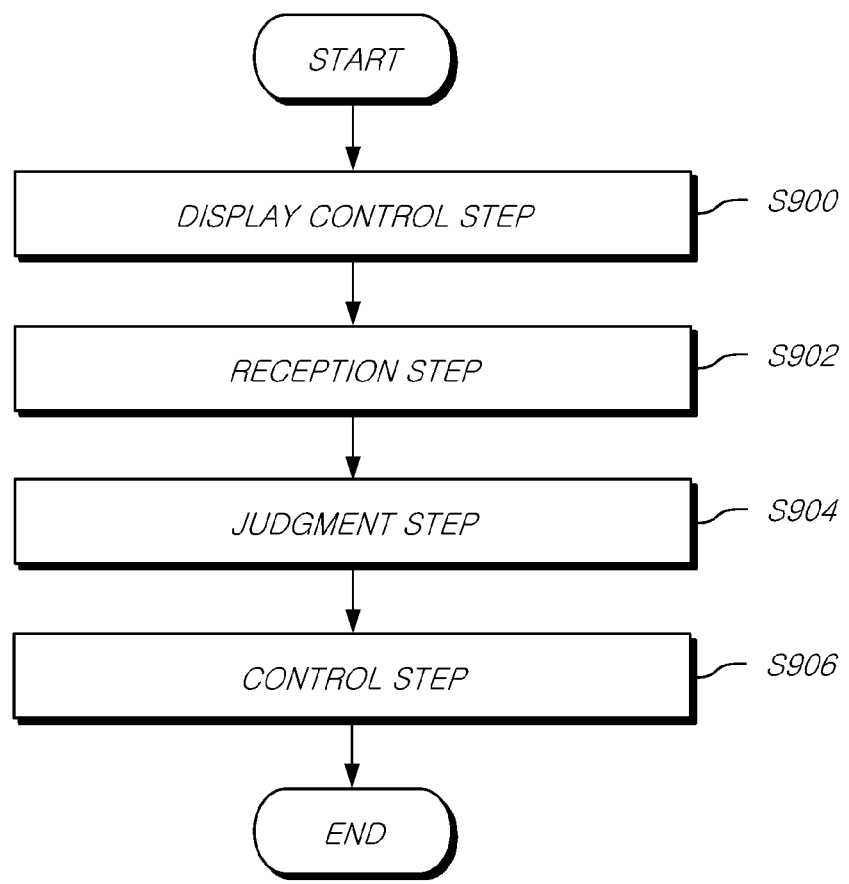
FIG. 9 is a flowchart illustrating a game control method according to an embodiment of the present invention.

FIG. 9 is a flowchart illustrating a game control method according to an embodiment of the present invention.

The present invention may include: a display control step that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a reception step that receives a user input signal for each judgment area indicator; a judgment step that judges whether note processing is successfully performed based on information associated with the proximity between the note and the judgment area indicator and the input signal; and a control step that controls the number of track areas or a user's obtained score to be changed when it is determined that the note processing is successfully performed.

Referring to FIG. 9, the game control method of the present invention includes a display control step (operation S900) that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas. The display control step sets the plurality of areas on the game screen as track areas, and controls the track areas to be separately configured. Particularly, the number of track areas may be determined based on game settings or a difficulty level that a user selects when a game starts. The track areas may be configured as top-to-bottom areas or left-to-right areas of the game screen, or may be configured based on a predetermined angle. Also, the track areas may be configured in shapes that are symmetric based on the center of the game screen. Also, the display control step may control a judgment area indicator to be displayed on the game screen for each track area. The judgment area indicator may be displayed in one end of the game screen based on the movement direction of the note, and may be displayed for each track area. The display control step may configure a judgment area indicator for each track area using the shape and color of the judgment area indicator according to previously stored game settings, and may display the same. The display control step may dynamically set the location of a judgment area indicator displayed on the game screen based on the difficulty level of the game or the progress of the game. Also, the display control step controls the output of a note that is displayed moving in the direction where a judgment area indicator is located along a track area. Particularly, the display control step may display a note that moves within each track area configured on the game screen. In addition, the display control step may control the displaying of various effects required for the game. The display control step may control displaying a character, the retained skill of a character, various skill effects based on the activation of a retained skill.

The game control method of the present invention includes the reception step (operation S902) that receives a user input signal for each judgment area indicator. The reception step may receive a user input signal, which is input through an input unit of a game apparatus. The user input signal may be obtained as a predetermined key is input, or may be obtained by recognizing a touch input through a touch screen. In addition, the user input signal may be input using a separate touch input means, such as a touch pad or the like, thereby being obtained. The method of obtaining a user input signal is not limited.

The game control method of the present invention includes the judgment step (operation S904) that judges whether note processing is successfully performed based on information associated with proximity between a note and a judgment area indicator and an input signal. For example, the judgment step determines the degree of proximity between a note and a judgment area indicator at a point in time when a user input signal is input (or received), and determines whether note processing is successfully performed based on the corresponding degree of proximity. Alternatively, the judgment step may set a score that a user may obtain as the note is processed to be different based on the information associated with the proximity between the note and the judgment area indicator. The judgment step may judge whether note processing is successfully performed by additionally taking into consideration the type of user input signal at the point in time when the input signal is received. For example, it is determined that note processing is successfully performed only when a user input signal satisfies a corresponding condition, based on the success judgment condition set for each note in the process of determining whether the note processing is successfully performed. For example, in the case of a note that has a function of changing the number of track areas, the judgment step judges whether note processing is successfully performed using whether the direction indicated by the direction indicating shape of the corresponding note is identical to the drag direction of the user input signal, as an additional element. As another example, in the case of a vibrato note, it is judged whether the corresponding note processing is successfully performed by additionally including, as a processing condition, a condition of inputting a user input signal by changing the drag direction at least a predetermined period of time or at least a predetermined number of times. In addition, the successful processing condition may be set to be different based on a function set for each note, and the successful processing condition may be associated with the shape of a corresponding note. The judgment step may distinctively control a judgment operation based on at least one of a super flick note, a slide note, and a change note.

When it is judged that note processing is successfully performed, the game control method of the present invention includes the control step (operation S906) that performs a control to change the number of track areas or a user's obtained score. For example, when it is judged that the processing of a note having a function of changing the number of track areas is successfully performed, the control step may increase or decrease the number of track areas in the area where the corresponding note is included. Also, the control step may perform a control to gradually apply an obtained score based on the number of track areas, or to change only the number of track areas irrespective of an obtained score. Also, the control step may control an obtained score in association with the processing of a slide note, a change note, and a super flick note, and may calculate an obtained score by applying a weight based on a retained skill of a character. Also, the control step may gradually apply an obtained score based on whether a retained skill is activated. Accordingly, a user may be immersed in the game due to the number of track areas that is dynamically changed, in addition to note processing occurring in a fixed track area.

The controller 140 of the present invention may change a user's obtained score based on a retained skill of at least one of the characters having different retained skills. Hereinafter, a detailed embodiment that controls a game using a character included in the game will be described.

For example, a retained skill includes at least one of: a passive skill that is activated without a predetermined condition; a first active skill that is activated when a first predetermined condition is satisfied; and a second active skill that is activated when a second predetermined condition is satisfied within a predetermined period of time after the first condition is satisfied. The passive skill may increase a score obtained in association with the processing of a basic note, a flick note, a long note, and a slide note based on a weight set in advance for each character. The first active skill is activated when the first predetermined condition is satisfied, and may include effects, such as obtaining a score, auto-play that automatically processes a note without an input, and generating a summoner that generates special effects.

For example, the first predetermined condition may indicate that notes are processed as at least one of PERFECT processing and GOOD processing at least a predetermined number of times. Under the first condition, when the notes are processed as at least one of PERFECT processing and GOOD processing at least a predetermined number of times, the controller 140 may control the game to activate the first active skill. Alternatively, the first predetermined condition may be the completion of charging a boost gauge bar. The amount of gauge of the charged boost gauge bar may increase by a factor of a predetermined number when the notes are processed successively. Otherwise, when processing the notes fails, the amount of gauge may decrease. As an example of obtaining a score, a score may be further obtained by increasing a bonus associated with the processing of notes by a predetermined value set in advance, or a score that is proportional to the number of notes that are displayed on a screen may be obtained.

When the first active skill is activated, an illustration that is stored in advance may be controlled to be displayed. The illustration is for informing a user that the first active skill is activated. For example, an illustration may include a character illustration. When two or more characters exist, the character illustration of one of the two or more characters may be displayed based on a ranking set in advance and the order of disposition. The character illustration is an illustration used for informing a user that the first active skill is activated, and any illustration providing the above effect may be used.

The second active skill may be activated when the second predetermined condition is satisfied within a predetermined period of time after the first condition is satisfied. The second predetermined condition may be an operation of processing a note set in advance (an alert that changes the left and the right sides including the track areas and notes based on the vertical center of a game screen) within a predetermined time, but it may not be limited thereto. That is, the condition may be based on situations that may be set in advance.

Also, the effect from the second active skill may increase a score during a predetermined period of time, but this may not be limited thereto. For example, the effect of the first active skill may be further applied during the predetermined period of time. Hereinafter, a game control method and apparatus using a character's retained skill will be described in detail with reference to drawings.

Figure 10:
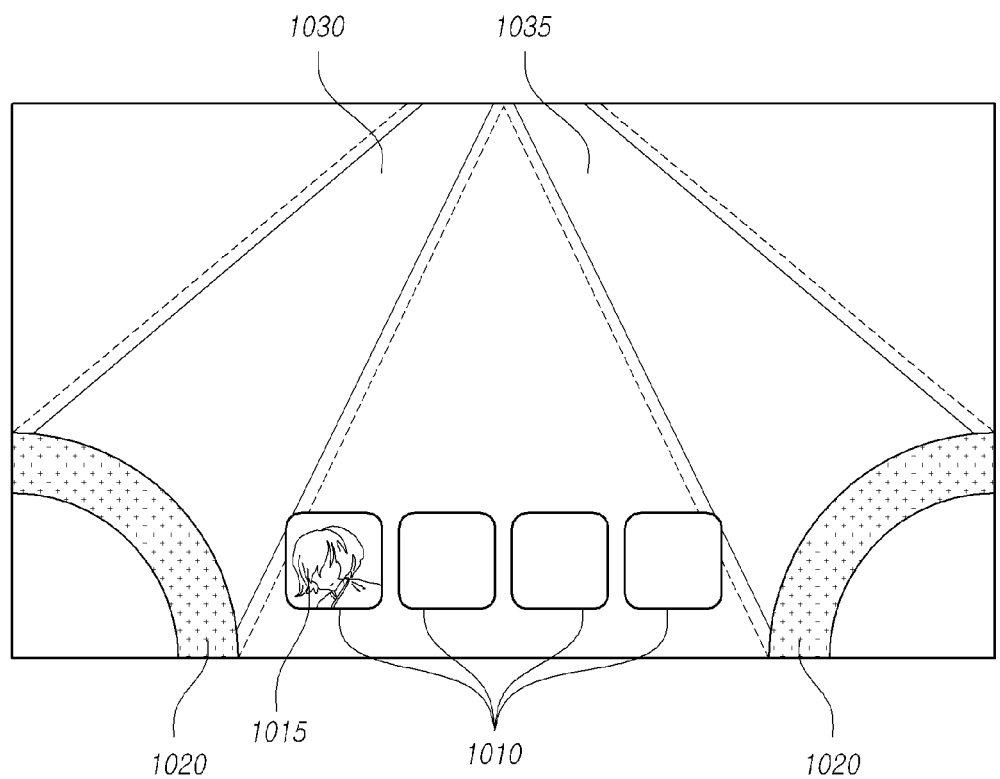
FIG. 10 is a diagram illustrating operations of a character according to an embodiment of the present invention.
Figure 11:
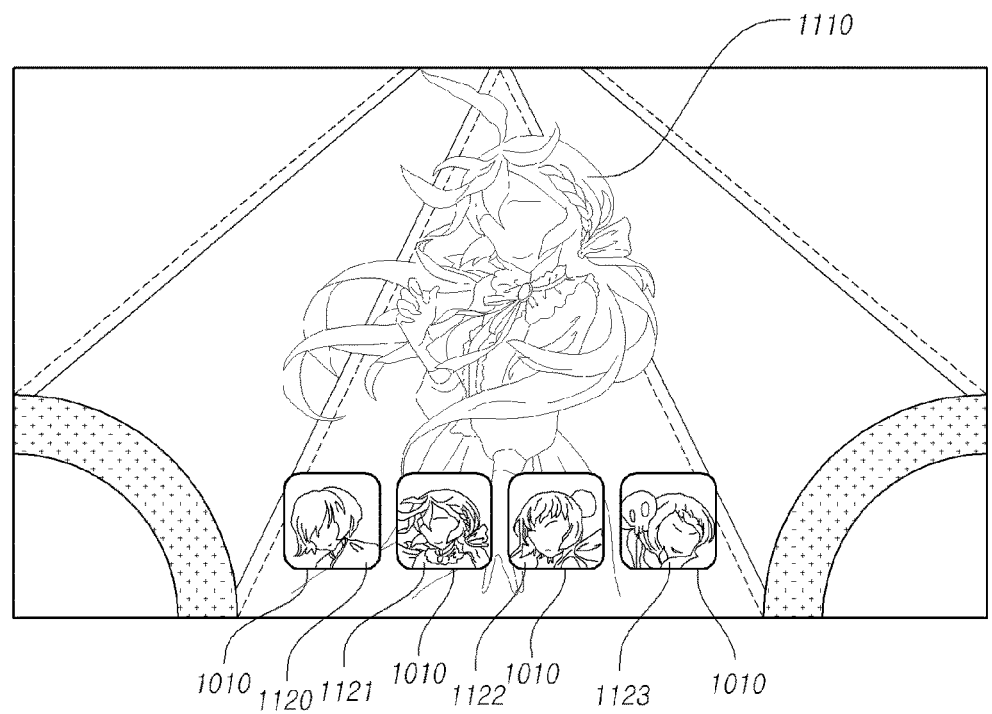
FIG. 11 is a diagram illustrating operations of a character based on a retained skill according to an embodiment of the present invention.

Referring to FIG. 10 and FIG. 11, a game control apparatus according to an embodiment of the present invention may control a game based on a retained skill of each of at least one of characters having different retained skills.

FIG. 10 illustrates a situation in which a first character 1015 is selected solely, although a game player may select 4 characters (4 is a number corresponding to the number of slots 1010) at the initial stage of a game. In the situation, a display controller may control notes to be located in one or more out of two track areas 1030 and 1035, and to move toward a judgment area indicator 1020. A controller may control a game according to the retained skill of the first character 1015 based on note processing.

For example, when an additional input is recognized after the notes are processed at least a predetermined number of times by an input through an input device, the controller may control the game according to a first active skill or a second active skill, which is one of the previously stored one or more retained skills of the first character 1015. Also, the display controller may control an action including an illustration to be displayed, and thus, may inform a user that the first active skill or the second active skill is activated. As the number of previously stored one or more images of the first character 1015 is large, a game screen control step may display various actions.

Under the situation, when two or more character illustrations are controlled to be displayed, the display controller may perform a control to display the illustration of a character which corresponds to a first ranking out of the two or more characters, based on a predetermined ranking and the order of disposition.

FIG. 11 illustrates a situation in which a game player selects a first character 1120, a second character 1121, a third character 1122, and a fourth character 1123, which are appropriate for 4 corresponding to the number of slots 1010 at the initial stage of a game. The display controller may control the illustration 1110 of the second character 1121 to be displayed.

The second character 1121 having a retained skill consumes the same character or a strengthen character, and the level may be increased. As shown in Table 1, based on an increased level, the activation condition (AWESOME count) of a retained skill may be eased, and the probability of activation and an activation time may be increased. The activation condition of a skill and the probability of activation may be a first condition of the first active skill or the second active skill, which is one of the retained skills.

TABLE 1

| Level | AWESOME count [times] | Probability of Activation [%] | Activation time [sec.] |
|---|---|---|---|
| Lv.1 | 50 | 20 | 3 |
| Lv.2 | 46 | 22 | 3.5 |
| Lv.3 | 42 | 24 | 4 |
| ... | ... | ... | ... |
| Lv.10 | 14 | 38 | 9.5 |

In Table 1, AWESOME count may be a value associated with note processing judgment.

In addition to the second character 1121 having a retained skill, the first character 1120, the third character 1122, and the fourth character 1123, which do not have a retained skill, may also consume the same character or a strengthen character, and the level may be increased. When the level reaches a predetermined level, the characters may obtain retained skills.

The first character 1120, the third character 1122, and the fourth character 1123, which are the characters that obtain retained skills by increasing their levels, may have at least one out of: an activation condition that is higher than the second character 1121 at the same level, a lower probability of activation, and a lower activation time.

In the situation in which two or more characters having the first active skill or the second active skill exist in the slot 1010, when two or more first active skills or second active skills are activated, the game screen control step may perform a control to display the illustration of one of the characters having the activated first active skill or the activated second active skill based on a predetermined ranking and the order of disposition. The ranking may be determined based on rarity from the perspective of obtaining a character. That is, a character that is more difficult to be obtained by a user may have a higher ranking.

For example, when the first character 1120, the third character 1122, and the fourth character 1123, which have low rarity, and the second character 1121, which has higher rarity, activate the first active skill, the display controller may perform a control to display the illustration 1110 of the second character 1121, which is a character having high rarity and has a higher ranking.

As another example, the second character 1121 having high rarity does not activate the first active skill and all of the first character 1120, the third character 1122, and the fourth character 1123 activate the first active skill, the display controller may perform a control to display the illustration of the first character 1120 that is located in the left of the slot 1110 and of which the order of disposition is earlier than others, since the characters have low rarity and have the same ranking. The rankings of characters that have the same rarity may be determined based on a level.

When a character activates the first active skill, the display controller, according to an embodiment of the present invention, may further perform a control to execute one or more out of: brightening the outside of the contour of the character, displaying a typography corresponding to the effect of a retained skill, and displaying an image corresponding to the effect of a retained skill.

The first active skill may correspond to one or more out of: a skill of performing auto-play with the best judgment and a skill of removing one or more of notes located in a track area. The best judgment may be a judgment made when a click input indication part of a basic note is exactly identical to a judgment area indicator and the basic note is processed; a judgment made by the judgment unit when a flick input indication part of a flick note is exactly identical to a judgment area indicator and the flick note is processed; a judgment made by the judgment unit when an input, which is maintained during a period of time corresponding to a line from the starting point to the endpoint of a long note, is exactly identical to a judgment area indicator and the long note is processed; and a judgment made by the judgment unit when a drag input indication part of a slide note and a judgment area indicator are exactly identical and a drag input is provided, and an input, which is maintained during a period of time corresponding to a line from the starting point and the endpoint at a location based on the drag input of the slide note, is recognized, and the slide note is processed.

Accordingly, when the auto-play skill is activated, notes are processed without providing an input to a judgment area indicator, and thus, a game player feels easy. Also, when a score is provided differently based on the result of the judgment, the game player may obtain the maximum score through the auto-play skill. In the same manner as the auto-play skill, the first active skill is activated, which controls one or more out of notes located in a track area, one or more notes that need to be processed are processed, and thus, the game player may provide a fewer number of inputs to the judgment area indicator and the game player may feel easy. Here, a score may be obtained in proportion to the number of processed notes. Therefore, the game player may strategically use characters when competing for a high score. For example, the first active skill may further obtain a score that is proportional to the number of notes that are displayed on the game screen. That is, when the first active skill is activated, all of the notes that are displayed on the game screen are processed. Accordingly, the game player may obtain a score.

Figure 12:
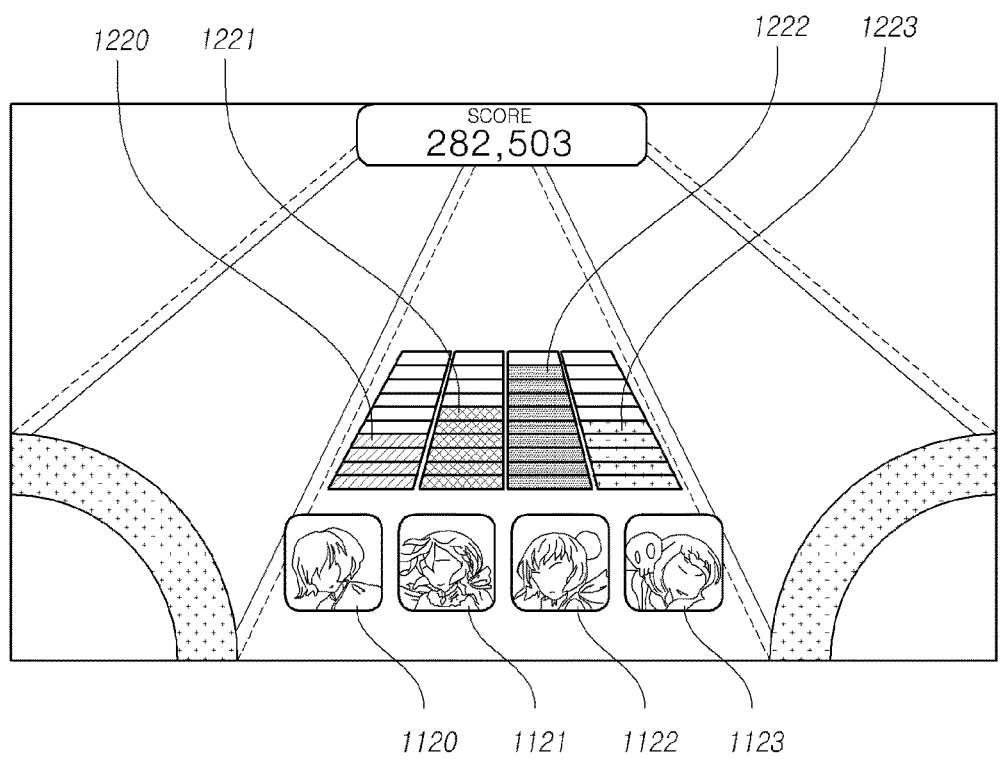
FIG. 12 is a diagram illustrating operations of a gauge bar according to an embodiment of the present invention.

The user's obtained score may be changed as the above described skill is activated. For example, the obtained score may be calculated to be different based on a character skill that the game player selects or retains to process a note. Particularly, a first character may have a retained skill that obtains an additional score that is set in advance for a basic note. Alternatively, a second character may have a retained skill that obtains an additional score that is set in advance for a slide note. Therefore, a final user's obtained score may be different based on a retained skill of a character although a user processes a note in the same manner. For example, under the assumption that a user processes 10 basic notes as perfect processing and processes 4 slide notes as perfect processing, a score obtained when only the first character is retained and a score obtained when only the second character is retained may be different. An additional score is applied for each note processing, or may be applied when a final obtained score is calculated. The above described additional score for each note may be displayed by a gauge bar that is displayed in connection with an individual character. For example, a gauge bar 1220 that is displayed in the upper portion of the first character 1120, as illustrated in FIG. 12, may express the amount of gauge by 4 entities having a color or a pattern corresponding to a basic note. A gauge bar 1221 that is displayed in the upper portion of the second character 1121 may express the amount of gauge by 6 entities having a color or a pattern corresponding to a flick note. A gauge bar 1222 that is displayed in the upper portion of the third character 1122 may express the amount of gauge by 9 entities having a color or a pattern corresponding to a long note. A gauge bar 1223 that is displayed in the upper portion of the fourth character 1123 may express the amount of gauge by 5 entities having a color or a pattern corresponding to a slide note.

The location of a track area in the present invention may be changed.

Figure 13:
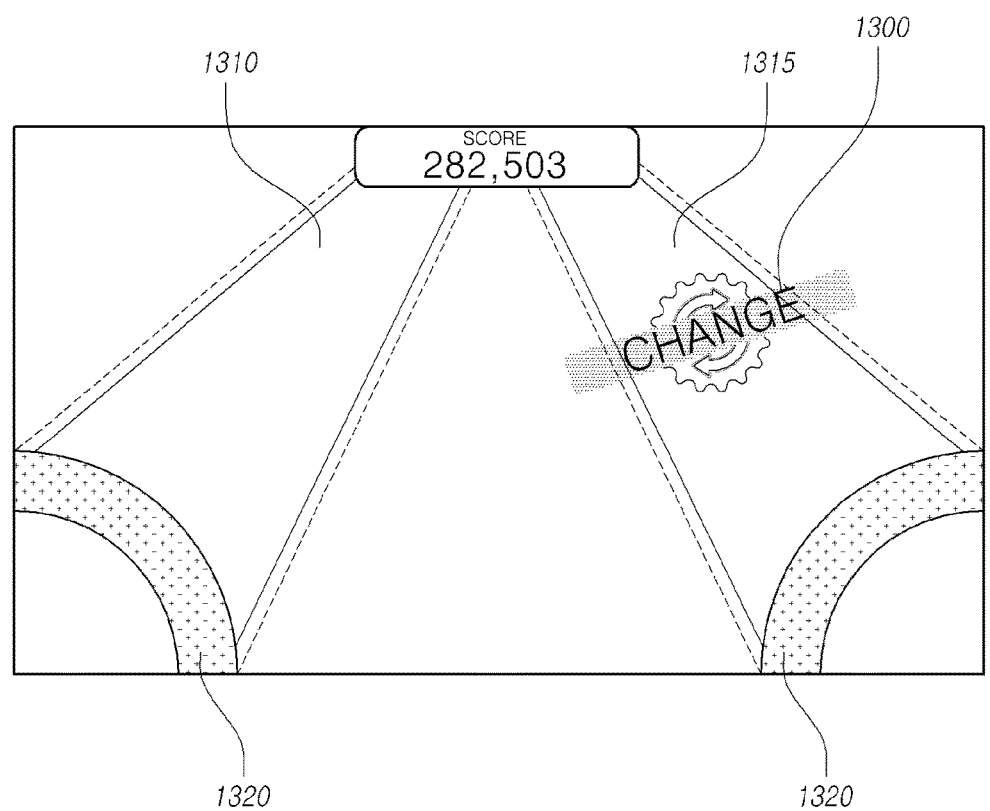
FIG. 13 is a diagram illustrating operations of a change note according to an embodiment of the present invention.

Referring to FIG. 13, the controller 140 may change the location of a track area or an obtained score based on a predetermined note. For example, when a change note 1300 arrives at a judgment area indicator 1520 irrespective of a user input, the controller 140 may perform a control to change the location of a first track 1310 and the location of a second track 1315. Alternatively, when it is determined that the change note 1300 is successfully processed by a user input, the controller 140 may perform a control to change the location of the first track 1310 and the location of the second track 1315.

In the case in which the location of a track is changed by the change note 1300, when a character that retains a second active skill exists, a score obtained by processing a note through the changed track may be increased. That is, the second active skill indicates a skill that provides an additional score when the location of a track is changed by the change note 1300. In addition, the second active skill may be applied only when the location of a track is changed by the change note 1300 within a predetermined period of time after a first condition is satisfied. The location of a track changed by the change note 1300 may be maintained during a predetermined period of time, or may be maintained until the location of the track is changed again by an additional change note.

Also, the above described first active skill or the second active skill may be activated when a boost gauge is charged. The boost gauge may be displayed in connection with a character, or may be displayed in connection with a track area. That is, the boost gauge may increase or decrease in connection with the color, shade, or shape of a track area. When the boost gauge is completely charged, a button for activating the first active skill or the second active skill in association with the boost gauge may be generated. A user may select a point in time when to activate a predetermined skill by operating a corresponding button.

Also, a game control apparatus provides a super flick note, and may adjust a user's obtained score based on the processing of the super flick note.

Figure 14:
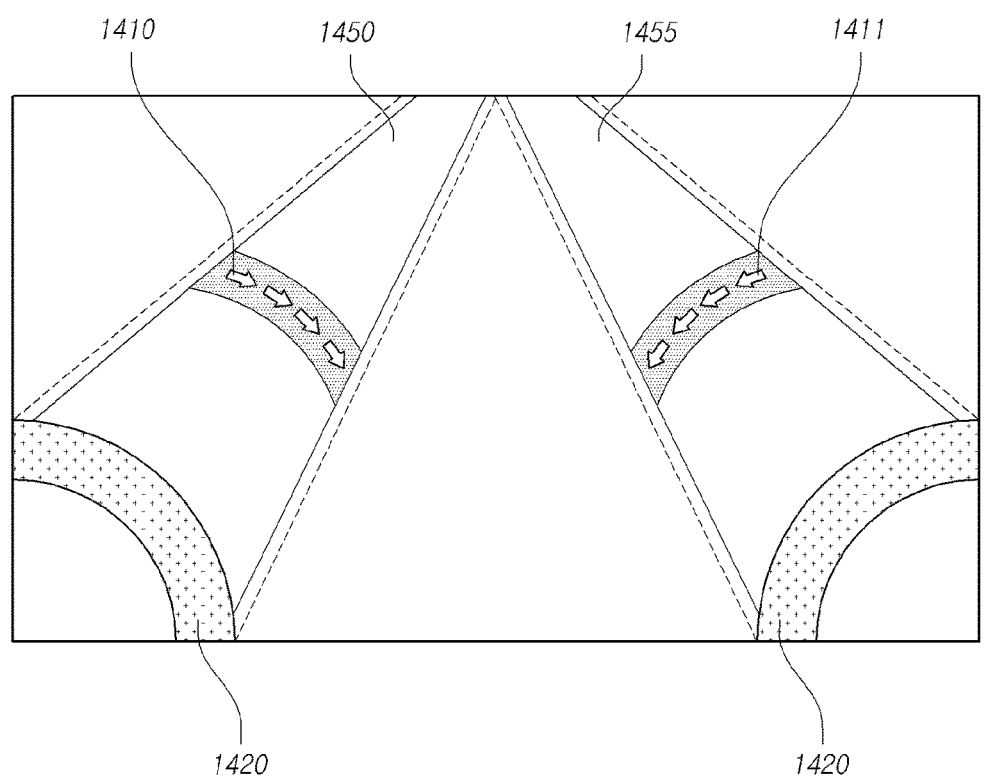
FIG. 14 is a diagram illustrating operations of a super flick note according to an embodiment of the present invention.

FIGS. 14 and 15 are diagrams illustrating processing of a super flick note.

Referring to FIGS. 14 and 15, a game control apparatus may further perform a control so that a super flick note 1410 and 1411 is displayed moving toward a judgment area indicator 1420, wherein the super flick note 1410 and 1411 may be processed by inputting a drag input that covers the width of two track areas 1450 and 1455 and provides dragging from a starting point to an endpoint in a given direction. The processing is successfully performed when the judgment area indicator 1420 recognizes a drag input in the state in which the super flick note 1410 and 1411 moves and overlaps the judgment area indicator 1420. Two super flick notes 1410 and 1411 may be located in two tracks 1450 and 1455 as illustrated in the drawing, but the locations may not be limited thereto.

Descriptions will be provided in detail with reference to FIG. 15, when a drag input from the left to the right is input into a left judgment area indicator 1520 and a drag input from the right to the left is input into a right judgment area indicator 1521 (S1) at a point in time when a super flick note 1510 and 1511 overlaps a corresponding judgment area indicator 1520 and 1521, a energy gauge bar 1515 corresponding to a game termination time is charged (S2-1), a boost gauge bar 1550 and 1555 is charged (S2-2), or a score 1590 corresponding to the content of a game may be increased (S2-3).

The amount of gauge of the energy gauge bar 1515 may be consumed based on the result of a judgment in a judgment step according to an embodiment of the present invention. When the whole amount of gauge of the energy gauge bar 1515 is consumed, the game may be terminated. For example, when it is determined that the result of the judgment is bad in the judgment step, a predetermined amount of gauge of the energy gauge bar 1515 may be consumed.

The game control apparatus and the game control method that have been described according to an embodiment of the present invention may be implemented by a program and may be recorded in a computer readable recording medium.

That is, each component or the operation of each step, which have been described with reference to FIGS. 1 to 15, may be implemented by each function that is implemented by a program to be described below, and is included in a computer readable recording medium. Although the detailed descriptions of some embodiments or some operations which have been described with reference to FIGS. 1 to 15 are omitted for avoiding redundancy, the game control apparatus or the game control method may be equivalently performed by functions included in the recording medium as described below.

A recording medium that records a program for implementing game control according to an embodiment of the present invention may include: a display control function that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas; a receiving function that receives a user input signal for each judgment area indicator; a judgment function that judges whether note processing is successfully performed based on information associated with the proximity between the note and the judgment area indicator and information associated with a point in time when the input signal is received; and a control function that controls the number of track areas or a user's obtained score to be changed when it is determined that the note processing is successfully performed.

The display control function that is recorded in the recording medium of the present invention may implement a function of: dividing a game screen into a first area and a second area based on a virtual central line; performing a control to display at least one track area in each of the first area and the second area; and displaying a note in at least one of the first area and the second area.

For example, when it is determined that note processing is successfully performed in any one of the first area and the second area, the control function may perform a control to change the number of track areas included in the area where the note processing is successfully performed, and to output the same. That is, the control function may dynamically change the number of track areas based on whether a note having a function of changing the number of track areas is successfully processed, and changing the number of track areas interworks with the note processing performed by a user during the progress of a game.

As another example, when it is determined that note processing is successfully performed in any one of the first area and the second area, the control function may implement a function of performing control to change the number of track areas included in the remaining areas excluding the area where the note processing is successfully performed, and to output the same.

The control function may implement a function of determining whether to increase or decrease the number of track areas based on the shape of a note. For example, the control function may increase or decrease the number of track areas to correspond to the shape of a note that a user successfully processes based on two or more shapes of the note, which are set in advance. For example, when a note including a direction shape indicating the outside of a game screen is successfully processed, a track area may be added. Conversely, when a note including a direction shape indicating the outside of the game screen is successfully processed, a track area may be reduced. In addition, the control function may determine whether to increase or decrease the number of track areas using the shape of a note and information associated with the number of track areas where the game is currently played. For example, when the number of track areas where the game is currently played is 2, and a note that includes a shape indicating the outside is successfully processed, the control function may perform a control to increase the number of track areas. Unlike the above, when the number of track areas where the game is current played is 4, and a note that includes a shape indicating the outside is successfully processed, the control function may perform a control to decrease the number of track areas. That is, when the control function determines whether to increase or decrease the number of track areas, the control function may take into consideration the number of track areas embodied in the game at a point in time when processing a note, together with the shape of the note. Settings that determine whether to increase or decrease the number of track areas for various cases associated with the shape of a note and the number of track areas may be determined in advance. Alternatively, when the control function determines whether to increase or decrease the number of track areas, the control function may determine the number of track areas to be different based on the shape of a note and the number of track areas. That is, when it is determined to increase the number of track areas, the number of track areas and the shape of a note need to be taken into consideration for the determination of increasing n track areas.

The control function may implement a function of distinctively setting an obtained score associated with successful note processing, based on the number of track areas. The control function may determine an obtained score associated with successful processing of an individual note, to be different based on the number of track areas. Alternatively, an obtained score may not be changed. Alternatively, when a note having a function of changing the number of track areas is successfully processed, an obtained score associated with processing of the corresponding note may be set.

In addition, each function included in the recording medium of the present invention may implement all of the components or the operations in the steps, which have been described in the present specification.

An example of the computer readable recording medium includes a ROM, a RAM, a CD-ROM, a magnetic tape, a floppy disk, an optical data storing device, and the like, and also includes an implementation in the form of a carrier wave, (e.g., transmission through the Internet). Also, the computer readable recording medium may store or implement codes that are distributed to a computer system, a server, or the like, which is connected over a network, and is read by a computer in a distribution manner.

Further, functional programs, codes, and code segments for the implementation of the embodiments may be easily inferred by programmers in the art that the present invention pertains to.

When the game control apparatus 100 is a communication device that is capable of communicating with a computer system or a server through a network, such as a smart phone or the like, the game control apparatus 100 may read a program recorded in the recording medium by communicating with a computer system or a server that stores the recording medium that records the program for implementing a game method according to an embodiment of the present invention, and thus, may execute the corresponding game.

For example, the recording medium that records the program for implementing the game method according to an embodiment of the present invention may be stored in a web server that stores such an application program (application) and provides the application program to a desired terminal, and may be used by a web store service technology. Also, the recording medium that records a program for implementing the game method according to an embodiment of the present invention may be utilized by a game service technology or the like, which stores the recording medium in a game server or the like and transmits the same to a game control apparatus.

According to the present invention as described above, there is provided a game that variously controls the displaying of components on a game screen so as to allow various types of game play schemes. Through the above, a user may become more interested in the game. Also, according to the present invention, there is provided a game that is capable of providing various judgments, a detailed judgment, and an accurate judgment in association with an operation made by a user.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Further, all structural elements may be implemented in independent hardware respectively, but some or all of the structural elements may be selectively combined and implemented in computer programs which have a program module performing functions of some elements or all elements which are combined in one or more pieces of hardware. Codes and code segments forming the computer program can be easily conceived by an ordinarily skilled person in the technical field of the present invention. Such a computer program may implement the embodiments of the present invention by being stored in a computer readable storage medium, and being read and executed by a computer. A storage medium for the computer program may include a magnetic recording medium, an optical recording medium, a carrier wave medium and the like.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for controlling a game, comprising:
a display controller that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas;
a receiving unit that receives a user input signal for each judgment area indicator;
a judgment unit that judges whether note processing is successfully performed based on information associated with a proximity between the note and the judgment area indicator and the input signal; and
a controller that controls the number of track areas to be changed when the note processing is successfully performed.

2. The apparatus of claim 1, wherein the display controller performs a control so that the note is output, including, therein, a direction indicating shape that indicates a direction.

3. The apparatus of claim 1, wherein the display controller performs a control so that the single note is output moving in the direction of the judgment area indicator in the two or more track areas.

4. The apparatus of claim 1, wherein the judgment unit judges that the note processing is successfully performed when the input signal is received at a point in time when the note is located within a scope set in advance based on the judgment area indicator, and a direction indication of the note and a drag direction of the input signal are identical to each other.

5. The apparatus of claim 1, wherein the display controller performs:
dividing the game screen into a first area and a second area based on a virtual central line, and controlling at least one track area to be displayed in each of the first area and the second area; and
displaying the note in at least one of the first area and the second area.

6. The apparatus of claim 5, wherein the controller performs:
controlling the number of track areas included in an area where the note processing is successfully performed, to be changed and output when it is determined that the note processing is successfully performed in one of the first area and the second area.

7. The apparatus of claim 5, wherein the controller performs:

controlling the number of track areas included in the remaining areas excluding an area whether the note processing is successfully performed, to be changed and output when it is determined that the note processing is successfully performed in one of the first area and the second area.

8. The apparatus of claim 5, wherein, when the note is displayed in the first area and the second area at the same time, the note is displayed to be symmetrical against the virtual central line.

9. The apparatus of claim 1, wherein the controller determines whether to increase or decrease the number of track areas based on a shape of the note.

10. The apparatus of claim 1, wherein the controller performs:
controlling a user's obtained score to be changed when the note processing is successfully performed; and
distinctively setting an obtained score associated with successful note processing based on the number of track areas.

11. The apparatus of claim 1, wherein the note is displayed, including a start point and an endpoint that is connected in a predetermined length;
the judgment unit judges that note processing is successfully performed when the input signal is maintained from a point in time when the start point of the note arrives at the judgment area indicator to a point in time when the endpoint of the note arrives at the judgment area indicator,
wherein the input signal is a drag signal of which a drag direction is changed at least a predetermined number of times or at least a predetermined period of time within the track area.

12. The apparatus of claim 11, wherein the controller changes the user's obtained score when it is determined that the note processing is successfully performed.

13. The apparatus of claim 1, wherein the controller controls the user's obtained score to be changed based on a retained skill of at least one character out of a plurality of characters having different retained skills.

14. The apparatus of claim 13, wherein the retained skill includes at least one of: a passive skill that is activated without a predetermined condition, a first active skill that is activated when a first predetermined condition is satisfied, and a second active skill that is activated when a second predetermined condition is satisfied within a predetermined period of time after the first predetermined condition is satisfied.

15. A method of controlling a game, the method comprising:
a display controlling step that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas;
a receiving step that receives a user input signal for each judgment area indicator;
a judgment step that judges whether note processing is successfully performed based on information associated with a proximity between the note and the judgment area indicator and the input signal; and
a controlling step that controls the number of track areas to be changed when it is determined that the note processing is successfully performed.

16. A computer-readable recording medium that records a program for implementing game control, wherein the program implements:
a display controlling function that controls a game screen to be configured by being divided into a plurality of track areas, controls a judgment area indicator configured for each track area to be displayed on the game screen, and performs a control so that a note is output moving in the direction of the judgment area indicator along at least one out of the plurality of track areas;
a receiving function that receives a user input signal for each judgment area indicator;
a judgment function that judges whether note processing is successfully performed based on information associated with a proximity between the note and the judgment area indicator and the input signal; and
a controlling function that controls the number of track areas to be changed when it is determined that the note processing is successfully performed.

* * * * *